(12) United States Patent
Kando

(10) Patent No.: US 12,377,358 B2
(45) Date of Patent: Aug. 5, 2025

(54) COMPUTER-READABLE NON-TRANSITORY STORAGE MEDIUM, INFORMATION PROCESSING SYSTEM, AND INFORMATION PROCESSING METHOD

(71) Applicant: Nintendo Co., Ltd., Kyoto (JP)

(72) Inventor: Yuji Kando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 338 days.

(21) Appl. No.: 18/321,506

(22) Filed: May 22, 2023

(65) Prior Publication Data

US 2023/0372831 A1 Nov. 23, 2023

(30) Foreign Application Priority Data

May 23, 2022 (JP) ................................. 2022-084081

(51) Int. Cl.
*A63F 13/847* (2014.01)
*A63F 13/56* (2014.01)

(52) U.S. Cl.
CPC ............ *A63F 13/847* (2014.09); *A63F 13/56* (2014.09)

(58) Field of Classification Search
CPC ........ A63F 13/56; A63F 13/847; A63F 13/57; A63F 13/573; A63F 13/58; A63F 13/60; A63F 13/55
See application file for complete search history.

(56) References Cited

U.S. PATENT DOCUMENTS

| | | | |
|---|---|---|---|
| 2014/0221062 A1 | 8/2014 | Shinoda | |
| 2019/0366211 A1* | 12/2019 | Suzuki | A63F 13/25 |
| 2020/0114267 A1* | 4/2020 | Sakurai | A63F 13/5372 |
| 2020/0254335 A1* | 8/2020 | Taura | A63F 13/58 |
| 2020/0368617 A1 | 11/2020 | Kando et al. | |
| 2021/0038973 A1 | 2/2021 | Wada et al. | |
| 2021/0370175 A1* | 12/2021 | Sato | A63F 13/5258 |
| 2022/0062760 A1* | 3/2022 | Motokura | A63F 13/843 |
| 2022/0152481 A1* | 5/2022 | Taura | A63F 13/23 |
| 2023/0055446 A1* | 2/2023 | Masuda | A63F 13/55 |
| 2023/0277940 A1* | 9/2023 | Fukada | A63F 13/45 463/31 |

(Continued)

FOREIGN PATENT DOCUMENTS

| | | |
|---|---|---|
| JP | 2000-342855 | 12/2000 |
| JP | 2014-150848 | 8/2014 |

(Continued)

*Primary Examiner* — David L Lewis
*Assistant Examiner* — Matthew D Hoel
(74) *Attorney, Agent, or Firm* — Nixon & Vanderhye PC

(57) ABSTRACT

In a multiplayer game, an operation method in which player objects are operated is switched from an individual operation method to a joint operation method. In the individual operation method, each player is caused to move a sight which is an operation target of each player by a first operation method, each player object is caused to execute an action toward the sight by a second operation method, and the player object corresponding to each player is moved by a third operation method. In the joint operation method, the sight is moved by the first operation method performed by a first player, the action is executed by the second operation method performed by the first player, and a joint player object is moved by a fourth operation method performed by a second player.

20 Claims, 32 Drawing Sheets

(56) References Cited

U.S. PATENT DOCUMENTS

| | | | | |
|---|---|---|---|---|
| 2023/0372818 A1* | 11/2023 | Kando | .................... | A63F 13/52 |
| 2023/0372831 A1* | 11/2023 | Kando | .................... | A63F 13/56 |
| 2024/0082725 A1* | 3/2024 | Sato | .................... | A63F 13/2145 |
| 2024/0115950 A1* | 4/2024 | Hishida | ............... | A63F 13/5375 |
| 2025/0083046 A1* | 3/2025 | Sakaguchi | ............. | A63F 13/56 |
| 2025/0083047 A1* | 3/2025 | Sakaguchi | ............ | A63F 13/795 |

FOREIGN PATENT DOCUMENTS

| | | |
|---|---|---|
| JP | 2020-188985 | 11/2020 |
| JP | 2021-023667 A | 2/2021 |

\* cited by examiner

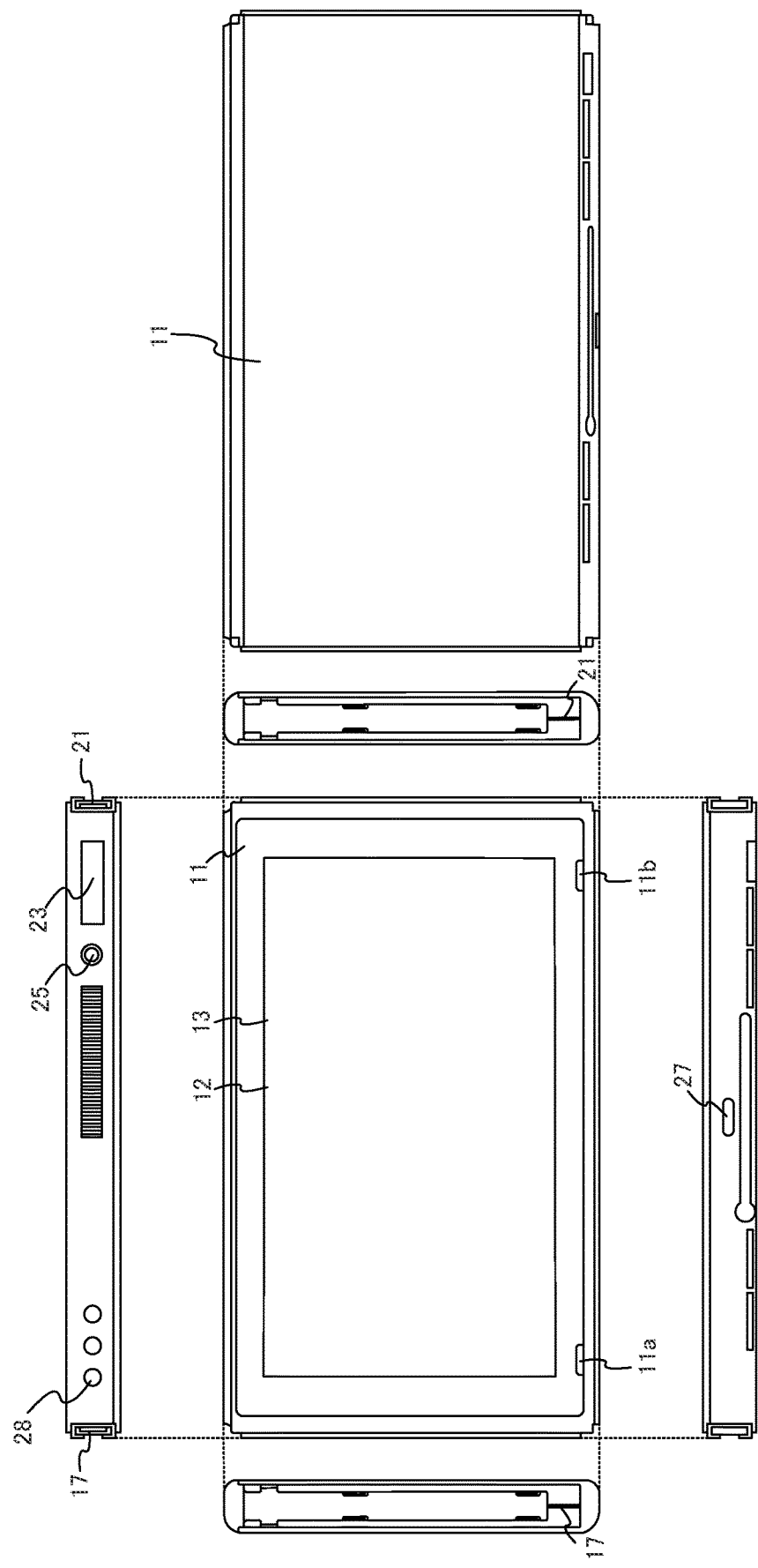

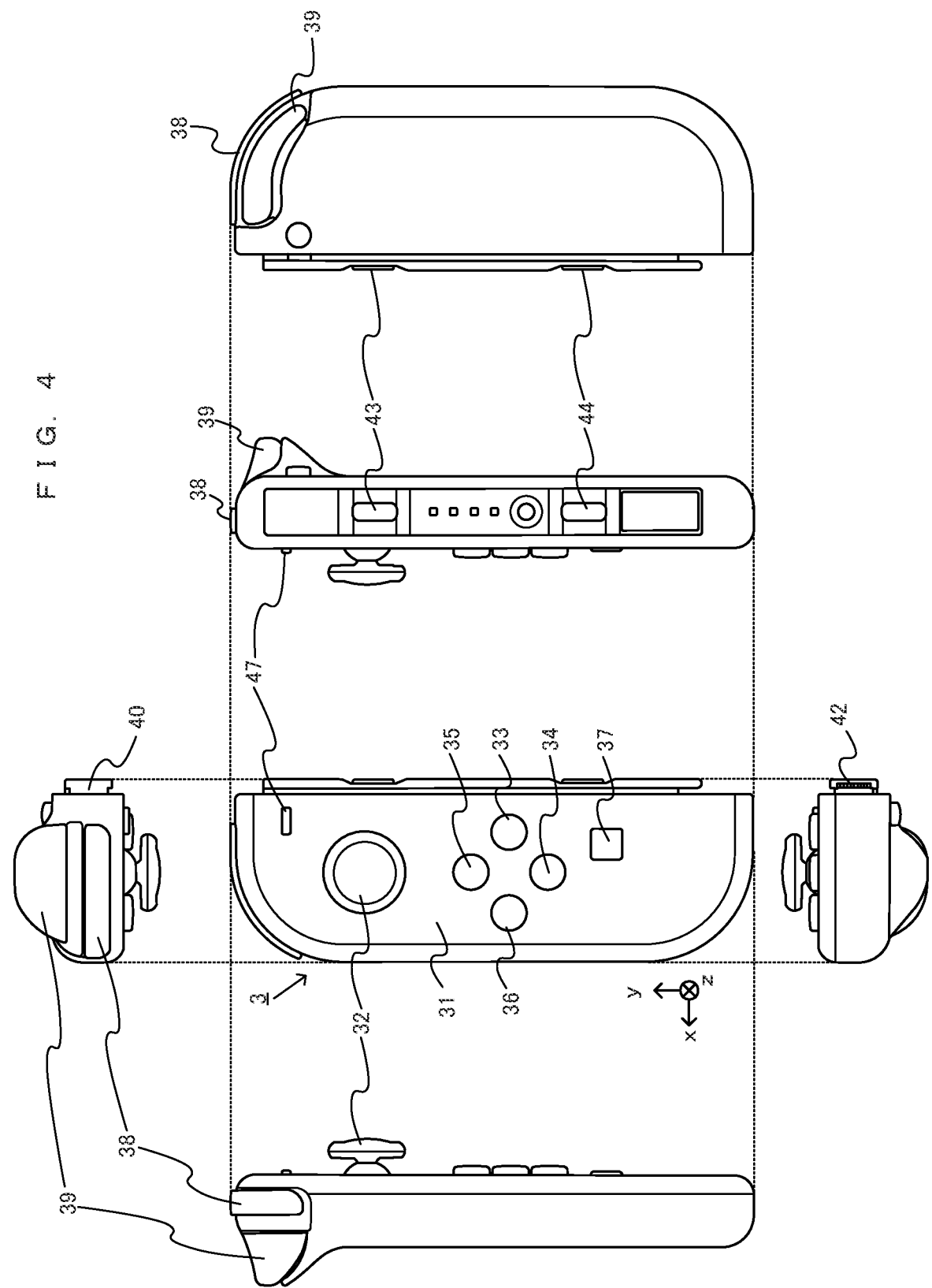

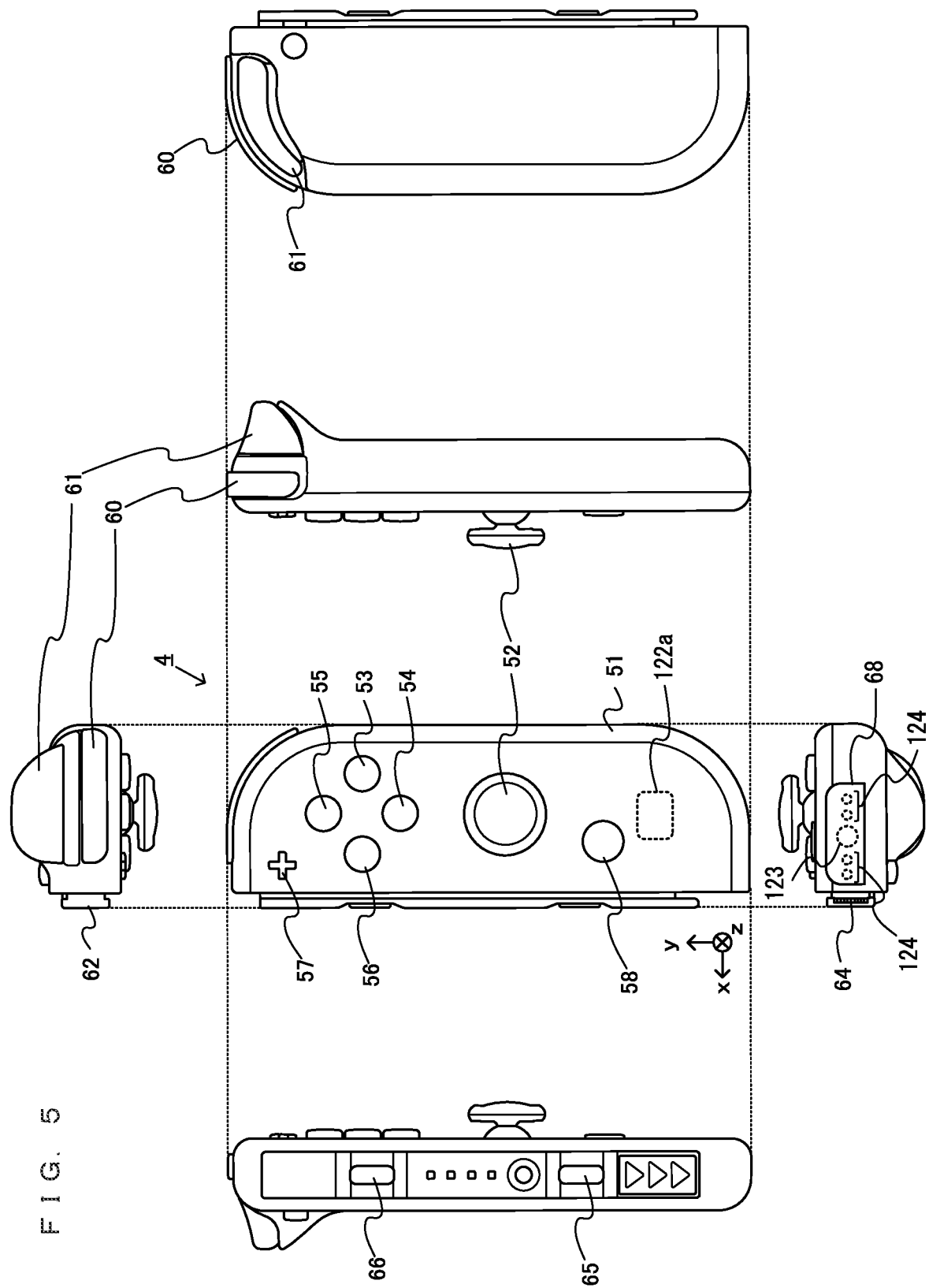

FIG. 10
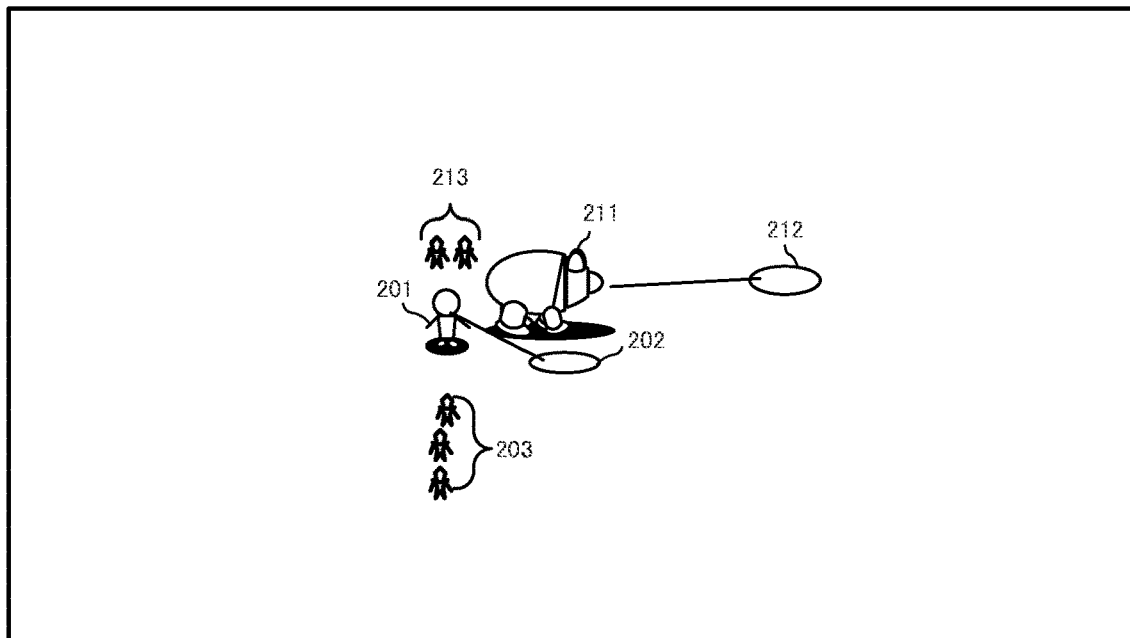
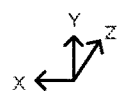
FIG. 11
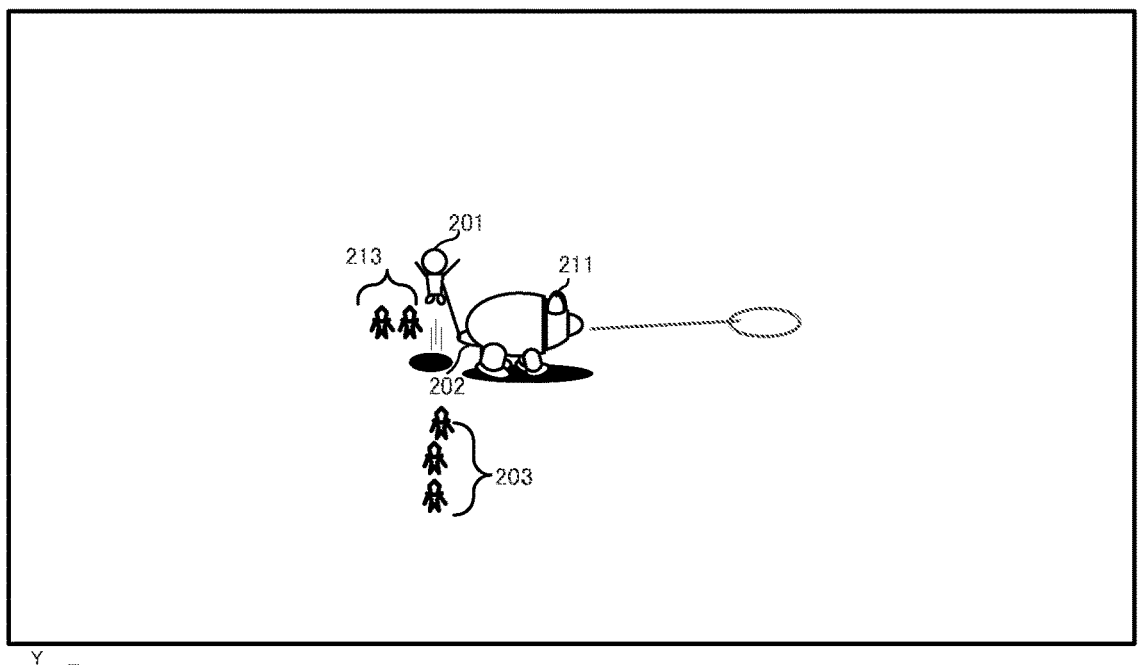
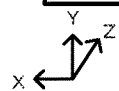

F I G. 1 2
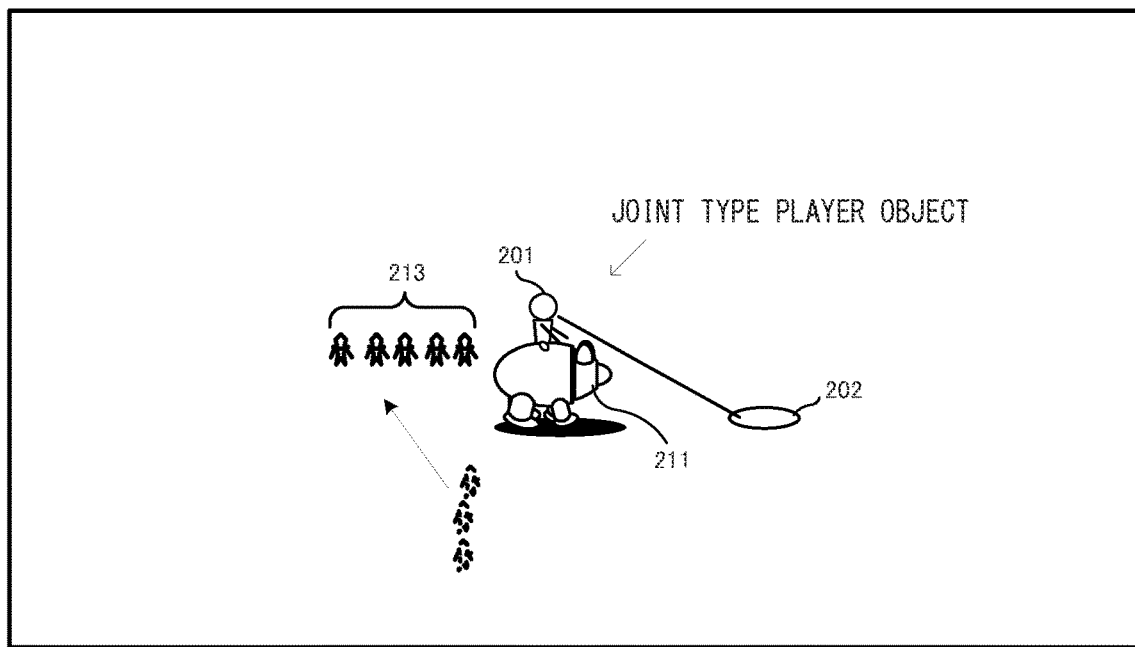
F I G. 1 3
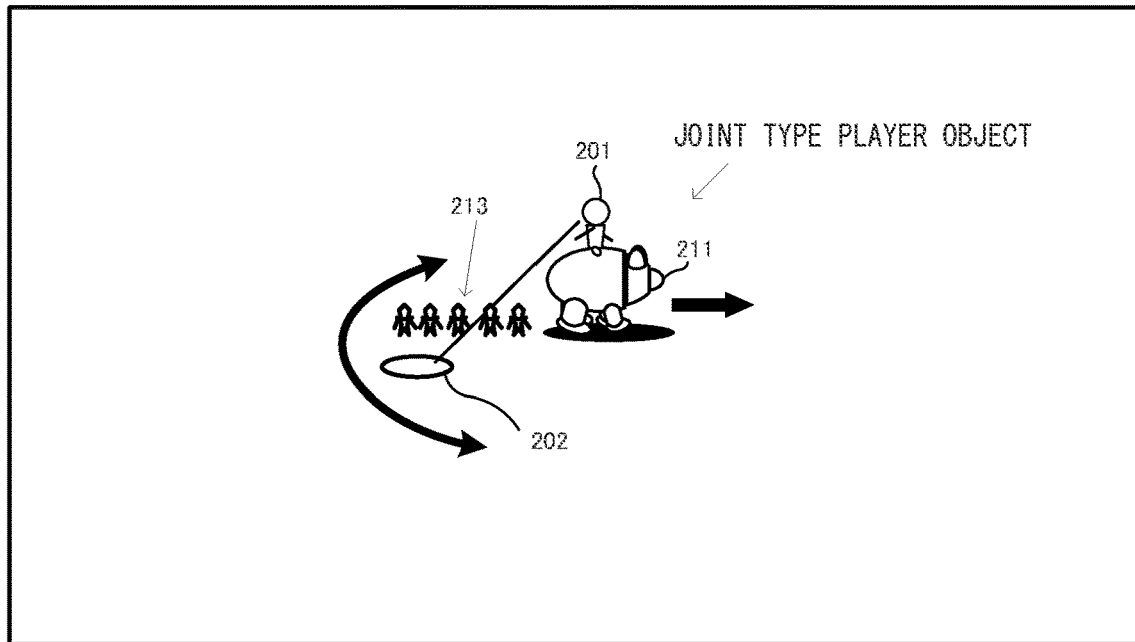

FIG. 14
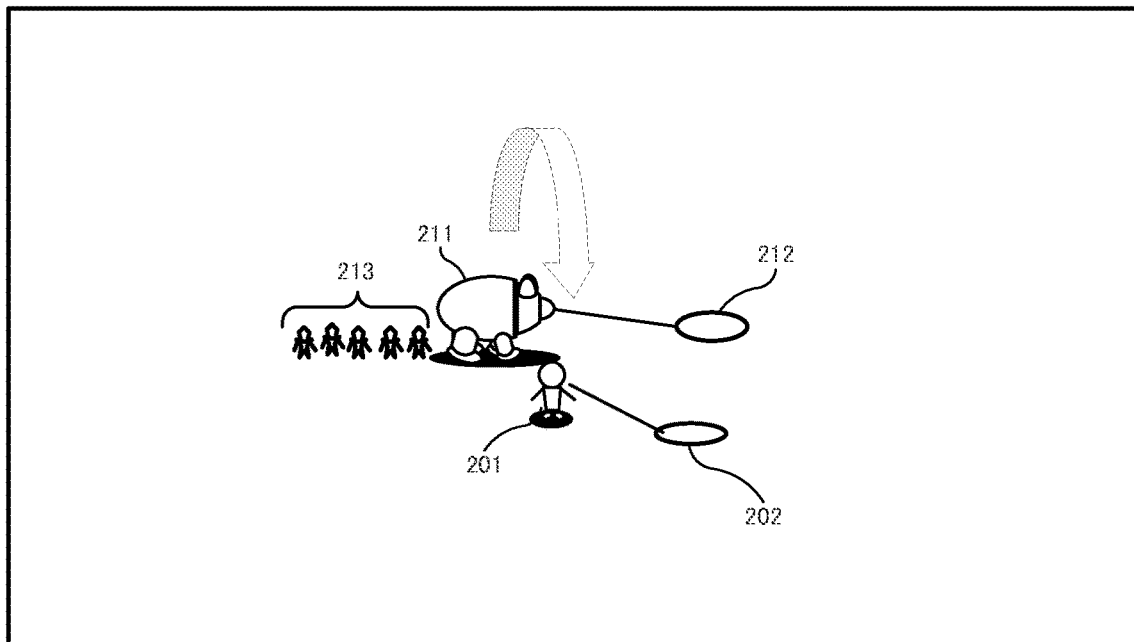
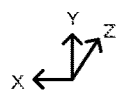
FIG. 15
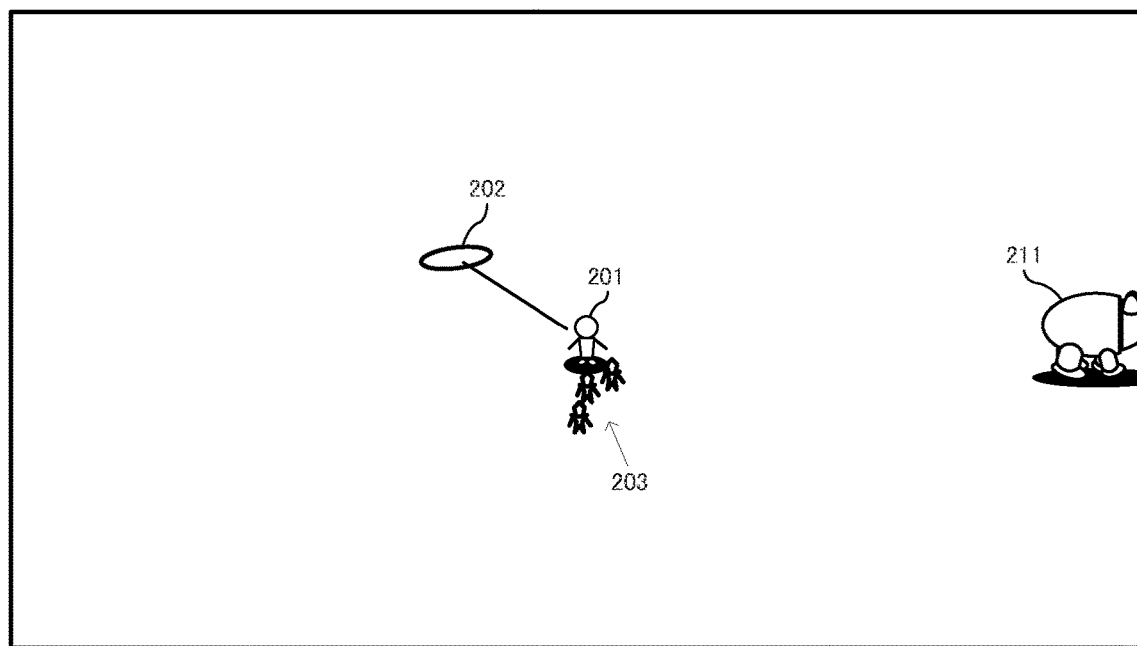
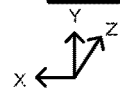

FIG. 16
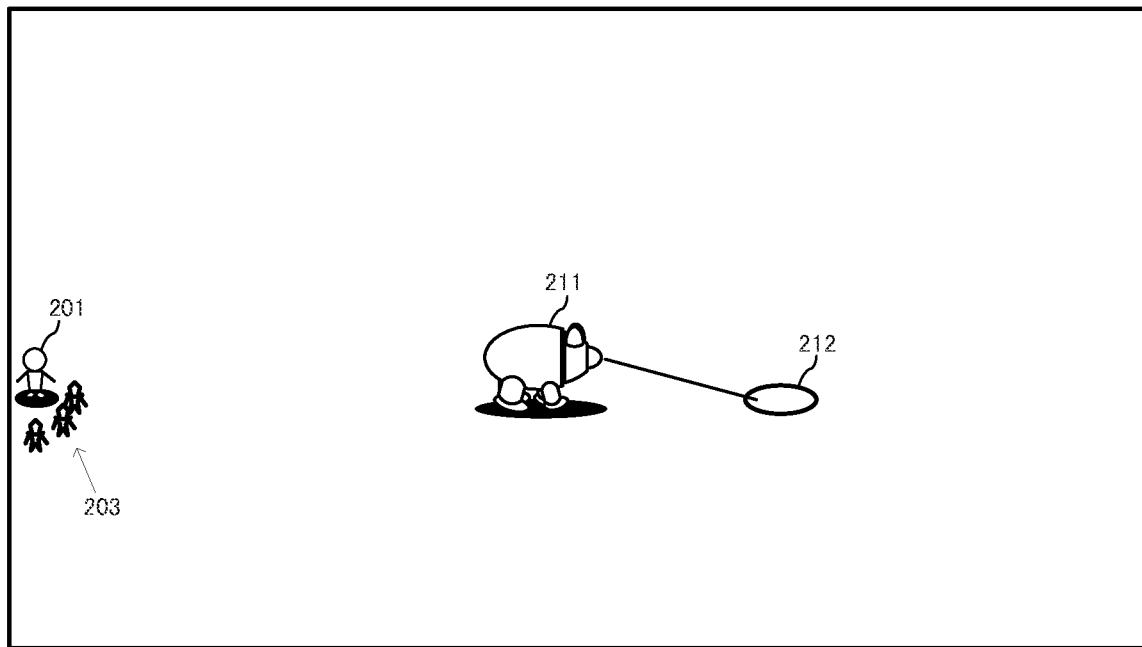
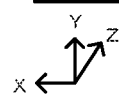
FIG. 17
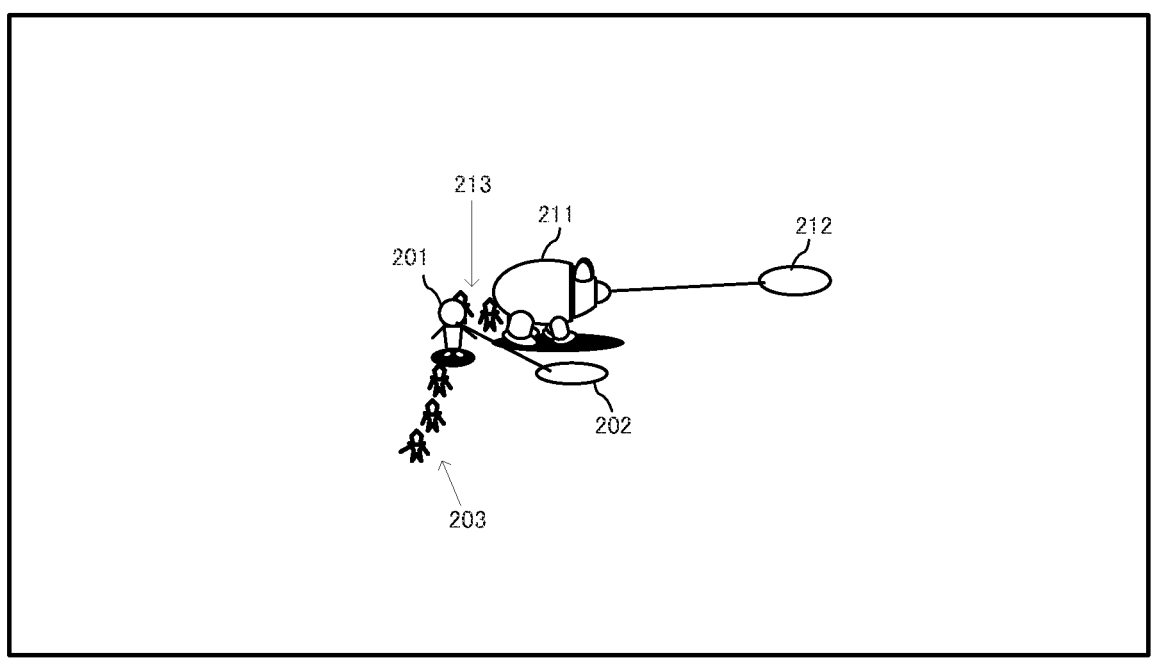

| ASSOCIATION OBJECT ID | CURRENT POSITION | CURRENT ORIENTATION | ASSOCIATION CHARACTER STATE | ASSOCIATION MOVEMENT PARAMETER | BELONGING PARTY |
|---|---|---|---|---|---|
| 0001 | (x,y,z) | ... | WAITING | ... | 1P CHARACTER |
| 0002 | (x,y,z) | ... | WAITING | ... | NON-BELONGING |
| 0003 | (x,y,z) | ... | MOVING | ... | 2P CHARACTER |
| ... | ... | ... | ... | ... | ... |

F I G. 2 5
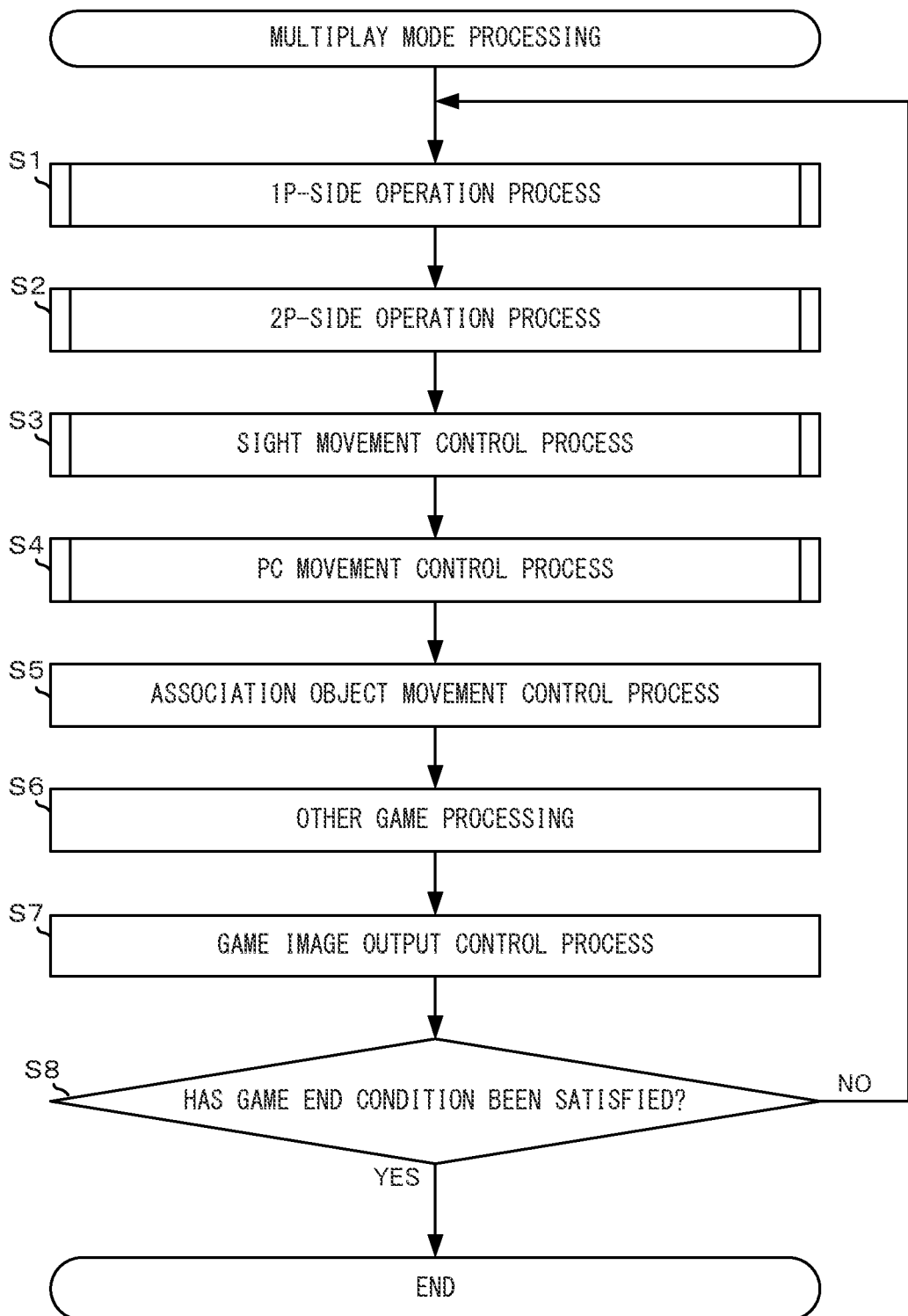

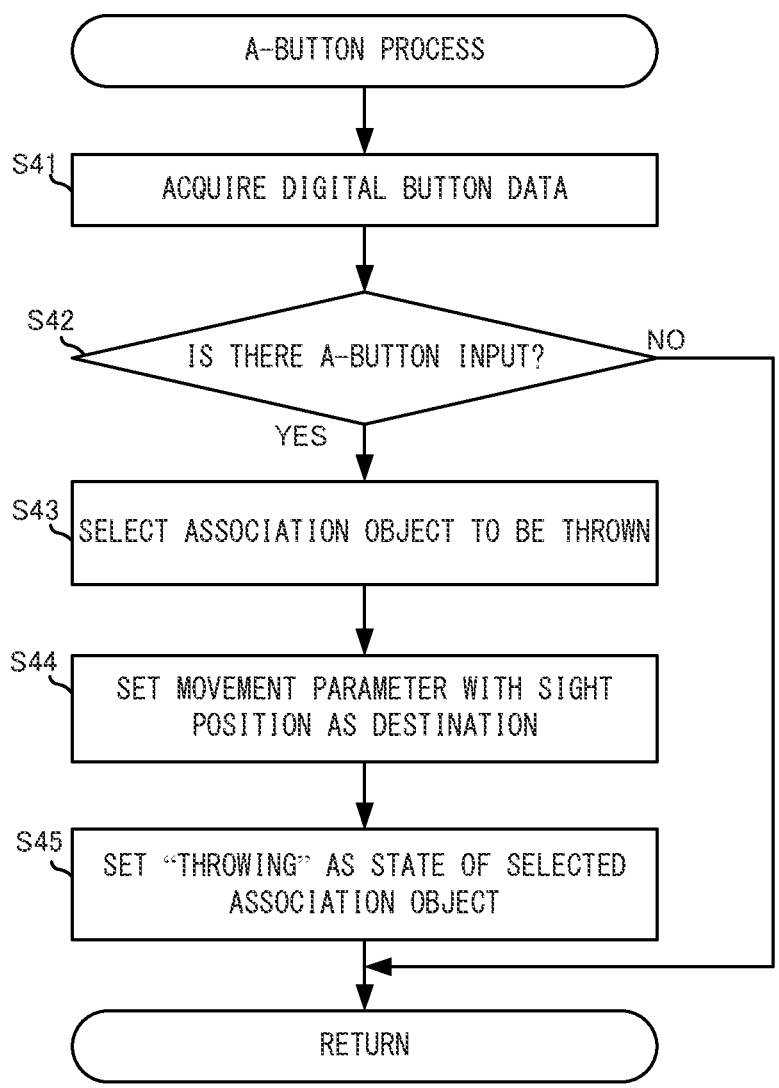
F I G. 2 8

F I G. 3 8
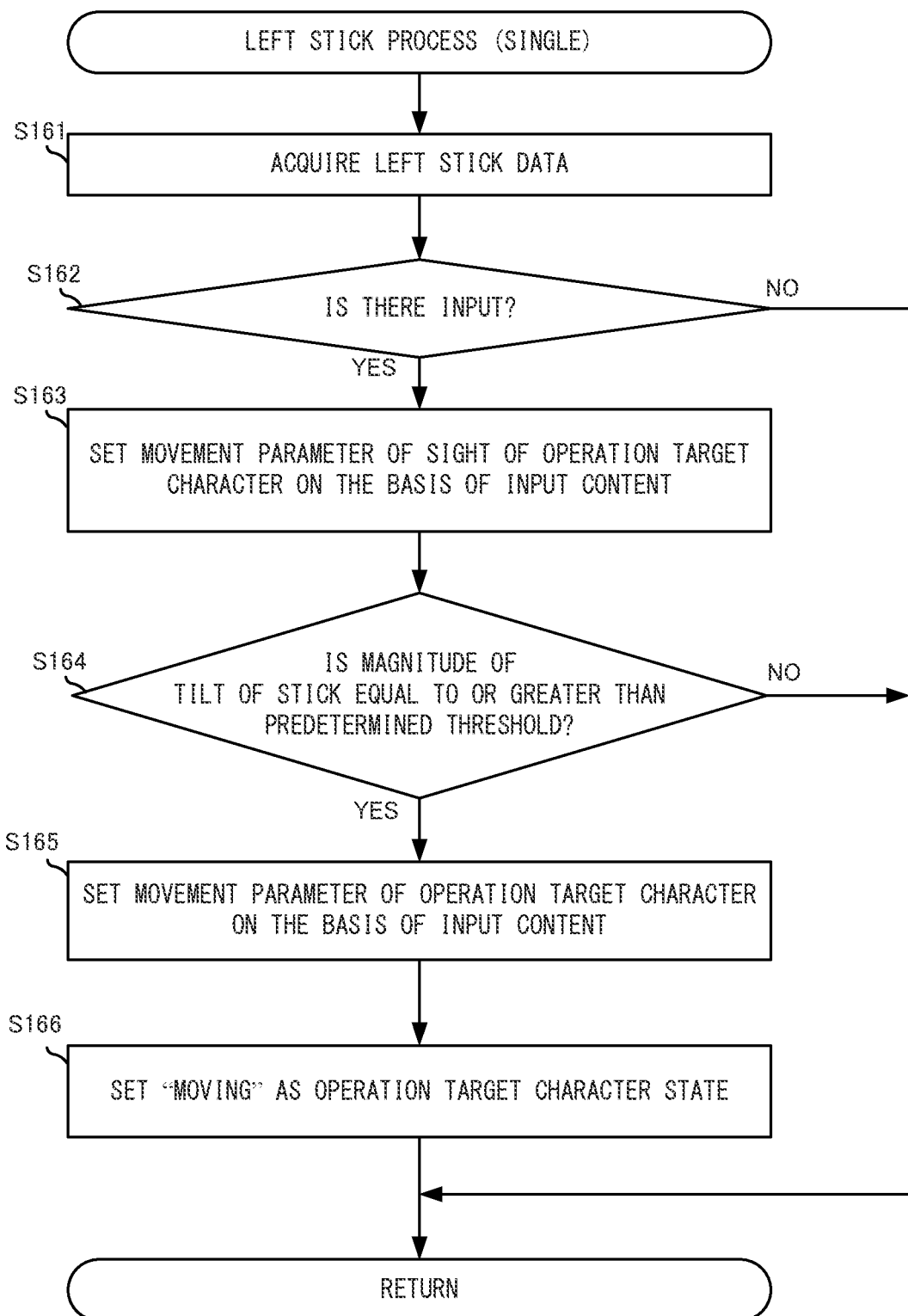

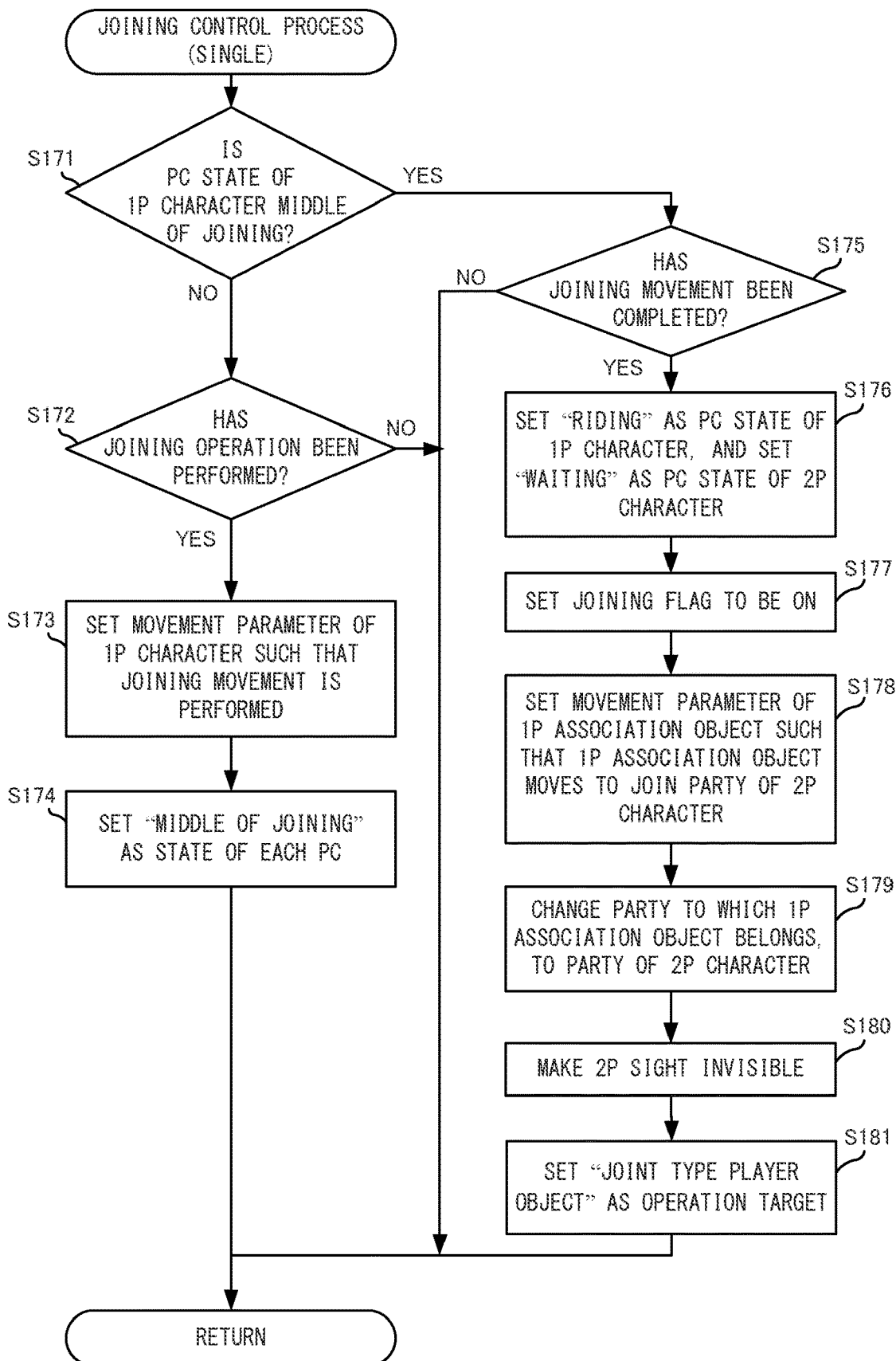

COMPUTER-READABLE NON-TRANSITORY STORAGE MEDIUM, INFORMATION PROCESSING SYSTEM, AND INFORMATION PROCESSING METHOD

CROSS REFERENCE TO RELATED APPLICATION

This application claims priority to Japanese Patent Application No. 2022-084081 filed on May 23, 2022, the entire contents of which are incorporated herein by reference.

FIELD

The present disclosure relates to game processing for moving a player character object and the like in a multiplayer game.

BACKGROUND AND SUMMARY

Hitherto, multiplayer type games such as games played simultaneously by two players, have been known. Furthermore, among such multiplayer games, a game having an element of combining (integrating) player character objects has also been known. Specifically, a racing game in which combining with another player character object can be performed by causing a predetermined event during a race has also been known.

In the above game, as for the operation of the combined object, roles are assigned such that one player performs a movement operation (is in charge of driving) and the other player performs a shooting attack operation (is in charge of attacking). As for the shooting operation, the other player can move a sight and can perform an operation of shooting at the sight.

In this regard, in the above game, in a state before the above combining, each player can only perform driving operations. Therefore, before the combining, each player only has to concentrate on driving operations, but after the combining, the other player needs to perform a sighting operation and a shooting operation which are not required before the combining. Therefore, for the other player, different operation methods are required before and after the combining, which provide complicated operability and operation feeling to the other player.

Therefore, an object of the present disclosure is to provide a computer-readable non-transitory storage medium, an information processing system, and an information processing method that can improve the ease of operation in a multiplayer game having an element of integrating a plurality of player objects.

In order to attain the object described above, for example, the following configuration examples are exemplified.

Configuration 1

Configuration 1 is directed to a computer-readable non-transitory storage medium having stored therein instructions that, when executed by a computer of an information processing apparatus, cause the computer of the information processing apparatus to:

in a multiplayer mode in which a video game is played by a plurality of players, switch an operation method in which player objects are operated by inputs by the plurality of players, from an individual operation method to a joint operation method when a switching condition is satisfied;

in the individual operation method,
move a sight associated with the player object corresponding to each of the plurality of players, by a first operation method using a sight movement instruction input performed by each of the plurality of players,
cause the player object corresponding to each of the plurality of players to execute an action toward the sight associated with the player object by a second operation method using an action instruction input performed by each of the plurality of players, and
move the player object corresponding to each of the plurality of players by a third operation method; and
in the joint operation method,
move the sight associated with a joint player object by the first operation method using the sight movement instruction input performed by a first player out of the plurality of players,
cause the joint player object to execute the action toward the sight associated with the joint player object by the second operation method using the action instruction input performed by the first player, and
move the joint player object by a fourth operation method based on a movement input by a second player out of the plurality of players.

According to the above configuration, each player has to perform both of movement operations for the sight and the player object, but by the joint operation method, each player only has to perform any one of the movement operations. Therefore, the ease of operation can be improved.

Configuration 2

According to Configuration 2, in Configuration 1 described above, the fourth operation method may be an operation method different from the third operation method.

According to the above configuration, the operation method suitable for the joint player object can be used.

Configuration 3

According to Configuration 3, in Configuration 1 or 2 described above, as the fourth operation method, the joint player object may be moved in a manner in which the joint player object is movable in a direction different from that of movement of the sight associated with the joint player object, on the basis of the movement input by the second player.

According to the above configuration, the sight and the player object can be moved independently of each other. Accordingly, the movement of the sight and the movement of the player object can be optimized.

Configuration 4

According to Configuration 4, in Configuration 3 described above, as the fourth operation method, the joint player object may be moved directly on the basis of the movement input by the second player.

According to the above configuration, as for the movement of the joint player object, more intuitive movement operations are enabled.

Configuration 5

According to Configuration 5, in Configurations 1 to 4 described above, the joint player object may be an object obtained by combining the player objects respectively corresponding to the plurality of players.

According to the above configuration, it is possible to indicate that the operation is divided, in a way that is easy for the player to grasp.

Configuration 6

According to Configuration 6, in Configuration 5 described above, the joint player object may be an object in which the player object corresponding to the first player in the individual operation method is placed on the player object corresponding to the second player in the individual operation method.

According to the above configuration, it is possible to clearly present that the player object on the lower side is in charge of movement.

Configuration 7

According to Configuration 7, in Configurations 1 to 6 described above, the switching condition may be satisfied when the first player performs a switching operation.

According to the above configuration, the first player can leave the operation for movement to the second player. Accordingly, the first player can concentrate on the operation for the sight.

Configuration 8

According to Configuration 8, in Configurations 1 to 7 described above, the operation method may be switched from the joint operation method to the individual operation method when the first player performs a cancellation operation when the operation method is the joint operation method.

According to the above configuration, it is possible to switch to the individual operation method at a timing that is convenient for the first player.

Configuration 9

According to Configuration 9, in Configurations 1 to 8 described above, the instructions may further cause the computer to, when the operation method is switched from the individual operation method to the joint operation method, associate association objects obtained by merging association objects associated with the player objects respectively corresponding to the plurality of players in the individual operation method, with the joint player object.

According to the above configuration, the number of association objects that can be used by the first player in the joint operation method can be increased.

Configuration 10

According to Configuration 10, in Configuration 9 described above, when the operation method is switched from the joint operation method to the individual operation method, the association objects associated with the joint player object in the joint operation method may all be associated with the player object corresponding to the second player.

According to the above configuration, when the operation method is switched from the joint operation method to the individual operation method, the association objects can be made not to be associated with the first player. How many association objects are to be associated with the first player depends on the situation, but by once causing a state where no association object is associated with the first player, it is possible for the players to discuss and adjust the necessary number. Accordingly, it is possible to flexibly handle the association of the association objects.

Configuration 11

According to Configuration 11, in Configurations 1 to 10 described above, the instructions may further cause the computer to, when the operation method is switched from the individual operation method to the joint operation method, associate a combined association object obtained by combining or synthesizing association objects associated with the player objects respectively corresponding to the plurality of players in the individual operation method, with the joint player object.

According to the above configuration, when using the joint operation method, the combined association object obtained by combining the association objects related to the plurality of players can be made usable by the players.

Configuration 12

According to Configuration 12, in Configurations 1 to 11 described above, as the third operation method, the player object corresponding to each of the plurality of players may be moved in conjunction with movement of the sight.

Configuration 13

According to Configuration 13, in Configuration 12 described above, the player object may be moved so as to follow the movement of the sight.

According to the above configuration, when using the individual operation method, each player can move the sight and the player object together in the same direction. Accordingly, in the case of the individual operation method, simple operability for the movement operation can be provided to the player.

Configuration 14

According to Configuration 14, in Configurations 1 to 13 described above, the player object corresponding to the second player in the individual operation method may have higher movement performance than the player object corresponding to the first player in the individual operation method, and the joint player object in the joint operation method may have the movement performance of the player object corresponding to the second player in the individual operation method.

According to the above configuration, the first player can be allowed to use the player object having higher movement performance. The possibility that the game development is made advantageous when the movement performance is increased is also increased, so that it is possible to provide motivation to actively utilize the joint player object, to the first player.

Configuration 15

According to Configuration 15, in Configurations 1 to 14 described above, the action may be an action of throwing a predetermined object toward the sight.

According to the above configuration, the player object is caused to perform an action of throwing a certain object toward the sight position. In the joint operation method, the first player can leave the operation for movement to the second player, and can concentrate on operations that require a certain degree of concentration, such as a sighting operation and a throwing operation. Therefore, for example, in a scene in which the player desires to perform accurate throwing while moving during the game, it is possible to provide motivation to actively utilize the joint operation method.

Configuration 16

According to Configuration 16, in Configurations 1 to 15 described above, the instructions may further cause the computer to,
- in a single play mode in which the video game is played by one player,
    - both when the player moves the sight associated with the player object corresponding to the player and when the player moves the sight associated with the joint player object, move the sight by the first operation method using the sight movement instruction input by the player,
    - both when the player causes the player object to execute the action and when the player causes the joint player object to execute the action, cause the player object or the joint player object to execute the action by the second operation method using the action instruction input by the player, and
    - both when the player moves the sight associated with the player object corresponding to the player and when the player moves the sight associated with the joint player object, move the player object by the third operation method.

According to the above configuration, even when the player utilizes the joint player object or even when the player does not utilize the joint player object, the same operability can be provided. Accordingly, it is possible to prevent the player from being confused about the operation method and provide comfortable game play to the player.

Configuration 17

According to Configuration 17, in Configuration 16 described above, the instructions may further cause the computer to, when a shift from a state where the player operates the sight of the joint player object to a state where the player operates the sight associated with the player object corresponding to the player in the single play mode is made, associate the association object associated with the joint player object, with the player object.

According to the above configuration, when a shift from the state where the player operates the sight of the joint player object to the state where the player operates the sight associated with the player object corresponding to the player is made, the association object can be quickly made usable.

Configuration 18

According to Configuration 18, in Configuration 16 described above, the instructions may further cause the computer to, when a character switching condition is satisfied in the single play mode, allow the player to switch between whether to operate the sight associated with the player object corresponding to the first player in the individual operation method or operate the sight associated with the player object corresponding to the second player in the individual operation method in the multiplayer mode.

According to the above configuration, one player is allowed to operate two different characters. Therefore, the operation can be divided using the two characters. In addition, an action that can be performed by only one of the two characters can be utilized according to the situation, so that the entertainment characteristics of the game can be improved.

According to the present disclosure, by switching from the individual operation method to the joint operation method, the ease of operation can be improved. In addition, room to selectively use the two operation methods according to the situation of the game can be provided to the player.

BRIEF DESCRIPTION OF THE DRAWINGS

FIG. 3 is six orthogonal views showing a non-limiting example of the main body apparatus 2;

FIG. 4 is six orthogonal views showing a non-limiting example of the left controller 3;

FIG. 5 is six orthogonal views showing a non-limiting example of the right controller 4;

FIG. 10 shows a non-limiting example of the game screen according to the exemplary embodiment;

FIG. 11 shows a non-limiting example of the game screen according to the exemplary embodiment;

FIG. 12 shows a non-limiting example of the game screen according to the exemplary embodiment;

FIG. 13 shows a non-limiting example of the game screen according to the exemplary embodiment;

FIG. 14 shows a non-limiting example of the game screen according to the exemplary embodiment;

FIG. 15 shows a non-limiting example of the game screen according to the exemplary embodiment;

FIG. 16 shows a non-limiting example of the game screen according to the exemplary embodiment;

FIG. 17 shows a non-limiting example of the game screen according to the exemplary embodiment;

FIG. 24 shows a non-limiting example of association object data 308;

FIG. 25 is a non-limiting example flowchart showing the details of multiplayer mode processing according to the exemplary embodiment

FIG. 28 is a non-limiting example flowchart showing the details of an A-button process;

FIG. 38 is a non-limiting example flowchart showing the details of a left stick process (single);

FIG. 39 is a non-limiting example flowchart showing the details of a joining control process (single)

DETAILED DESCRIPTION OF NON-LIMITING EXAMPLE EMBODIMENTS

Hereinafter, an exemplary embodiment will be described.

A game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
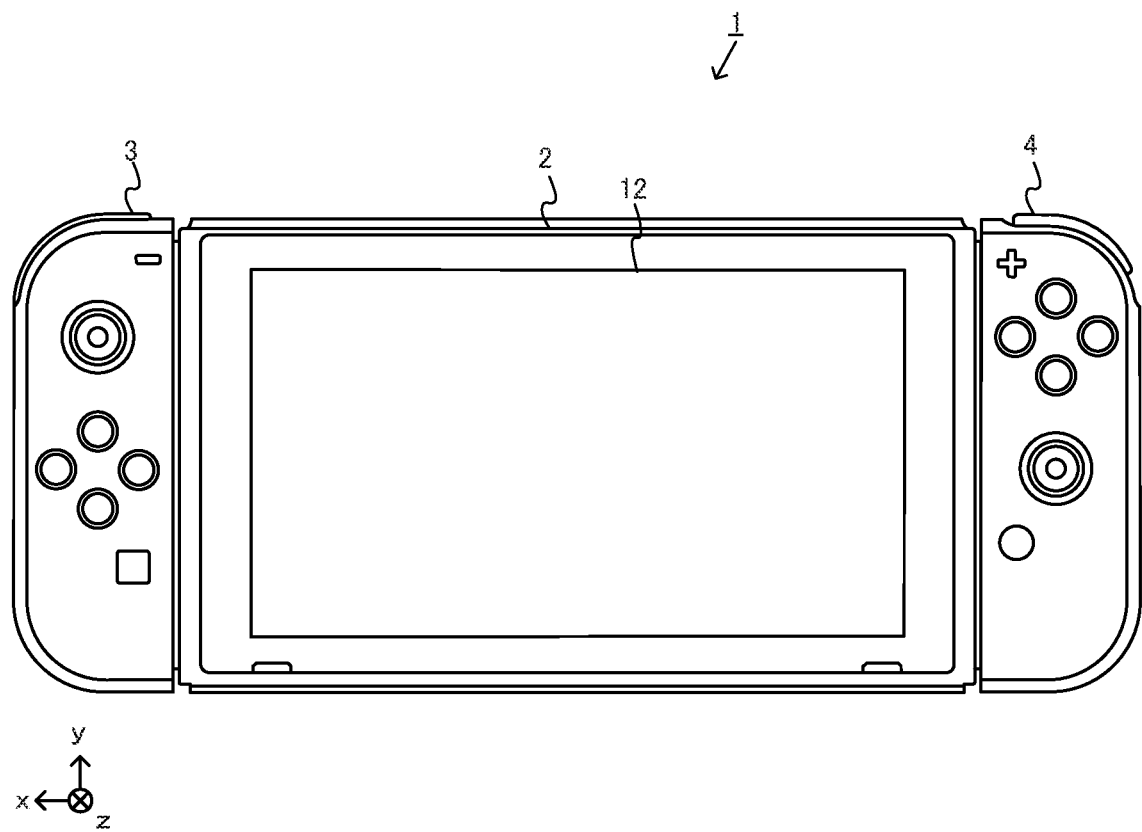
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a player provides inputs.

Figure 2:
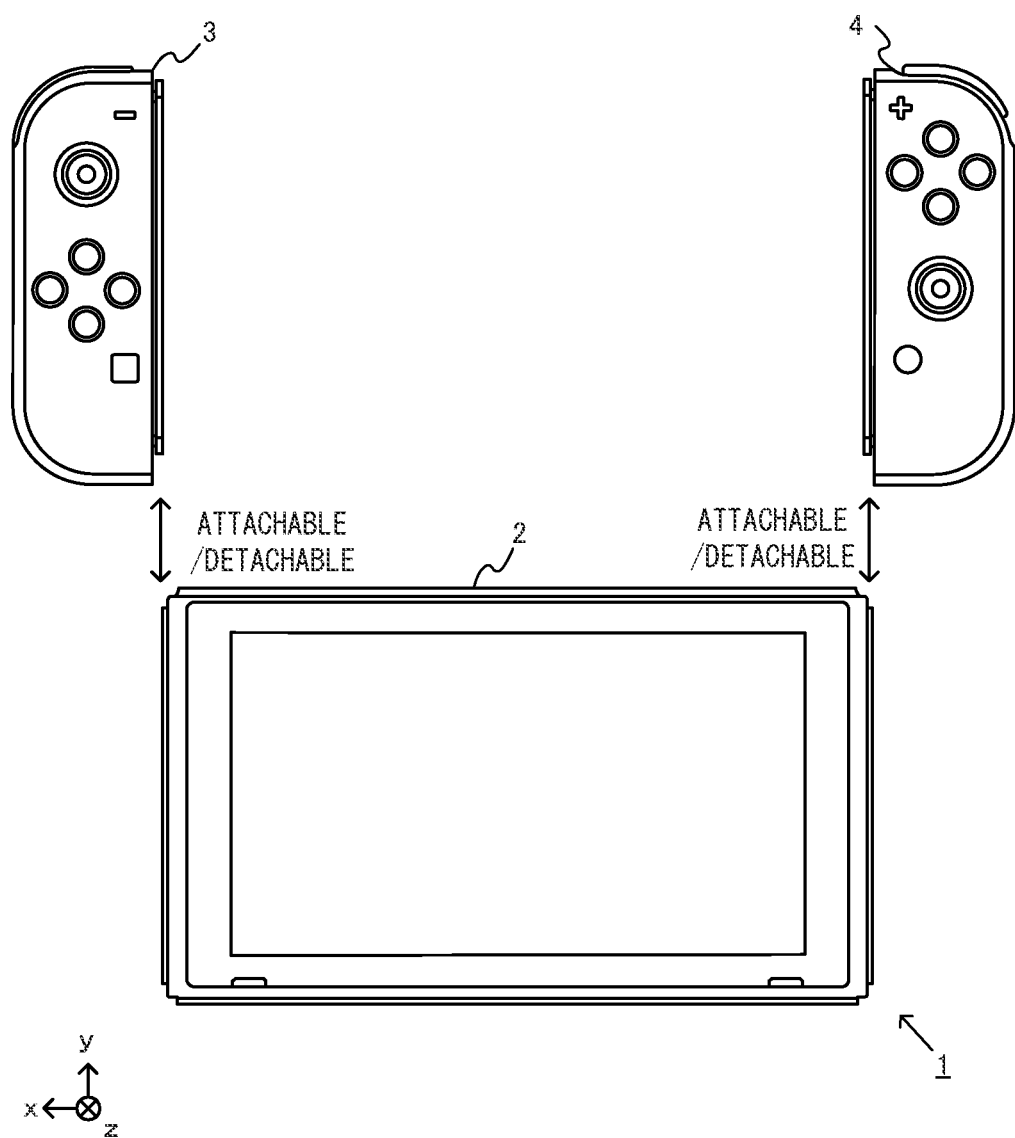
FIG. 2 shows a non-limiting example of a state in which the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed in the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The player tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "—" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
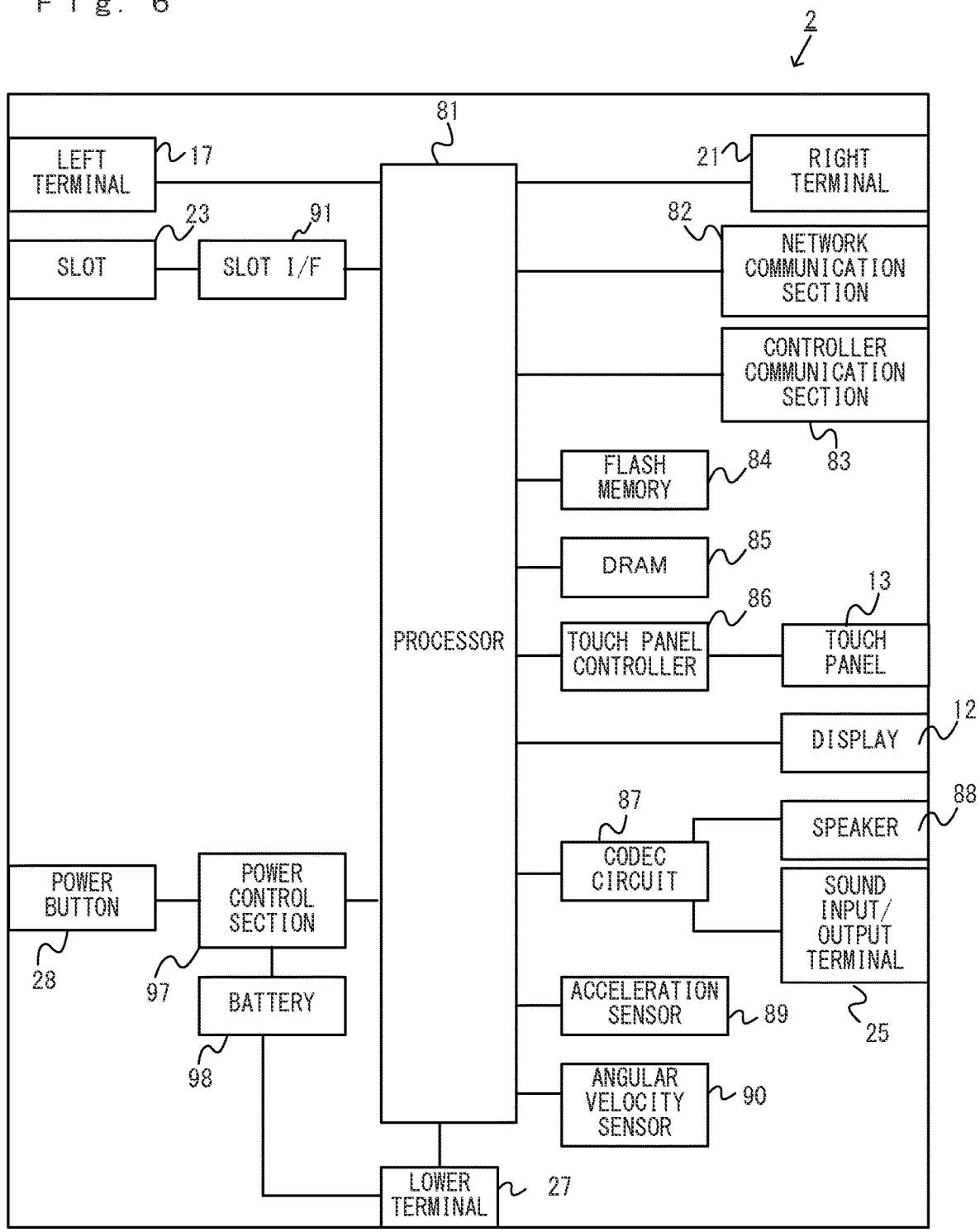
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of players can simultaneously provide inputs to the main body apparatus 2, each using a set of the left controller 3 and the right controller 4. As an example, a first player can provide an input to the main body apparatus 2 using a first set of the left controller 3 and the right controller 4, and simultaneously, a second player can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
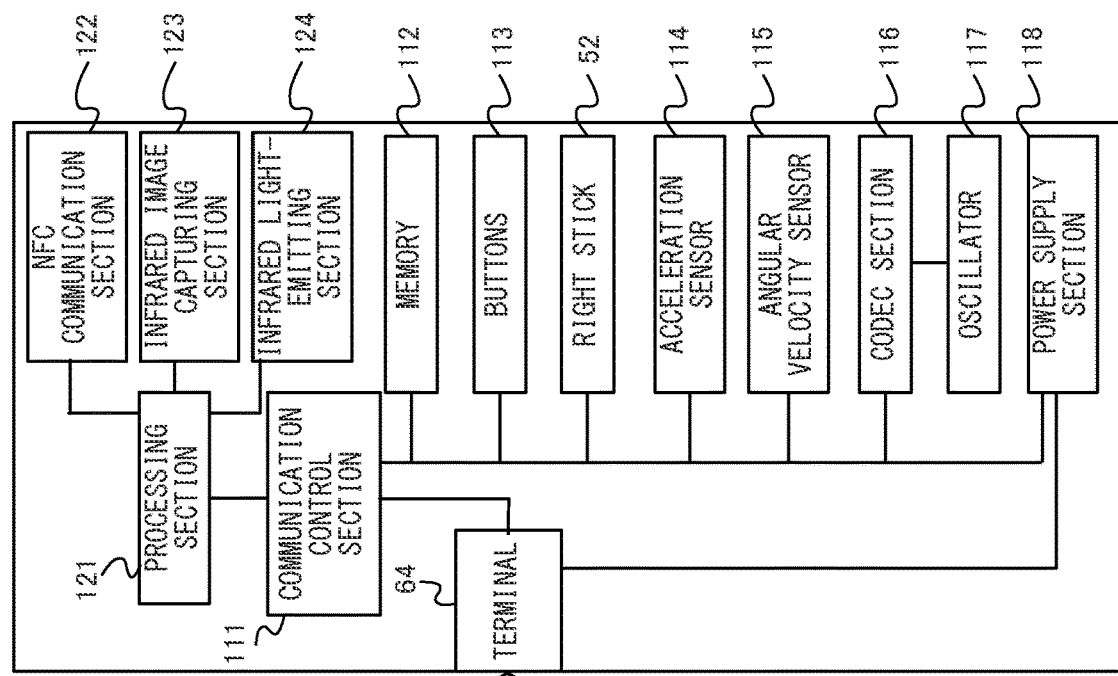
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing in Exemplary Embodiment]

Next, the outline of operation of the game processing executed by the game system 1 according to the exemplary embodiment will be described. As described above, in the game system 1, the main body apparatus 2 is configured such that each of the left controller 3 and the right controller 4 is attachable thereto and detachable therefrom. In a case of playing the game with the left controller 3 and the right controller 4 attached to the main body apparatus 2, a game image is outputted to the display 12. In a case where the main body apparatus 2 alone with the left controller 3 and the right controller 4 detached therefrom is mounted on the cradle, the main body apparatus 2 can output a game image to a stationary monitor or the like via the cradle. In the exemplary embodiment, the case of playing the game in the latter manner will be described as an example. Specifically, the main body apparatus 2 alone with the left controller 3 and the right controller 4 detached therefrom is mounted on the cradle, and the main body apparatus 2 outputs a game image and the like to a stationary monitor or the like via the cradle.

[Assumed Game]

A game assumed in the exemplary embodiment is a game that can be played by a single player and that can be played by two players in cooperative play. In the following description, a game mode in which a single player plays the game is referred to as single play mode, and a game mode in which two players play the game is referred to as multiplayer mode. Hereinafter, the outline of the game processing in the exemplary embodiment will be described. First, the game outline (operation and movement examples) of the multiplayer mode will be described, and then the outline (operation and movement examples) of the single play mode will be described. In the exemplary embodiment, each player plays the game using the left controller 3 and the right controller 4. That is, in the multiplayer mode, the case where two sets of the left controller 3 and the right controller 4 are used is assumed. Also, in the single play mode, the case where one set of the left controller 3 and the right controller 4 is used is assumed. Moreover, in the following description, the left controller 3 and the right controller 4 are sometimes collectively referred to simply as "controller".

[Outline of Game in Multiplayer Mode]

Figure 8:
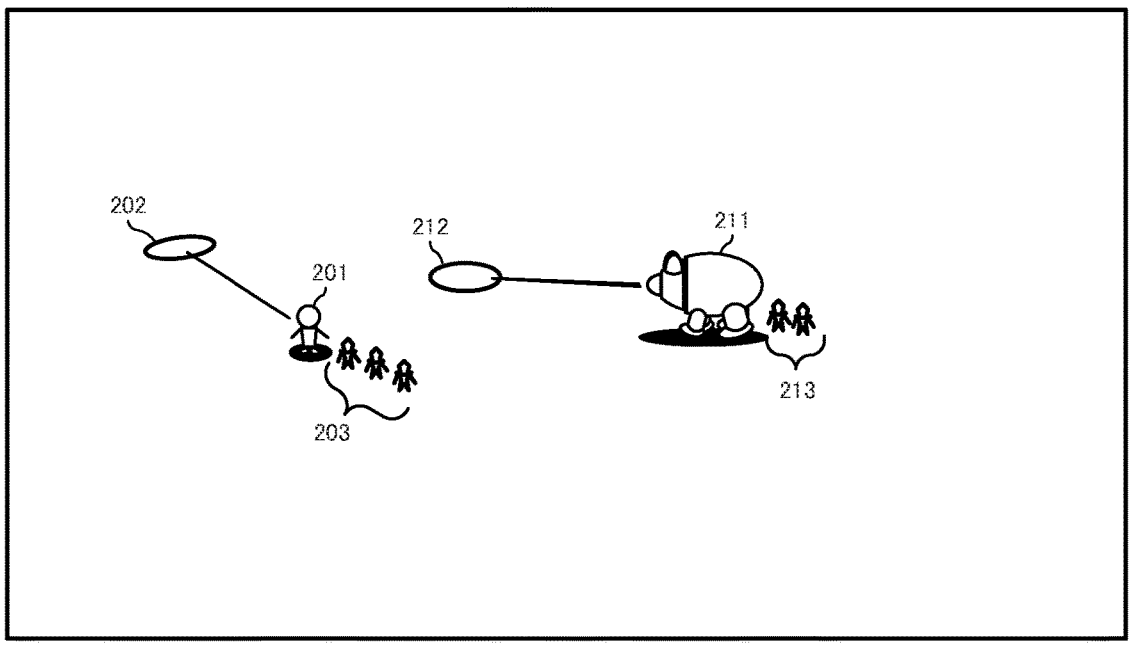
FIG. 8 shows a non-limiting example of a game screen according to an exemplary embodiment.

FIG. 8 shows an example of a screen of the game generated by taking, with a virtual camera, an image of a virtual three-dimensional game space that is a stage for the game. In FIG. 8, two player character objects (hereinafter, sometimes referred to as PCs) are displayed. Specifically, a first player character object (hereinafter, referred to simply as 1P character) 201 which is an operation target of a first player, and a second player character object (hereinafter, referred to simply as 2P character) 211 which is an operation target of a second player, are displayed. In the game, the 1P character 201 is a humanoid object, and is a "main character" in a story of the game. Meanwhile, the 2P character 211 is a character representing a quadrupedal animal as a motif, and is a character (support character) that supports the main character in the story of the game. In the game, based on this difference in role, a difference between the 1P character 201 and the 2P character 211 is provided mainly in terms of movement performance, and the movement performance of the 2P character 211 is higher than that of the 1P character 201. Specifically, there is a difference in movement speed, and the movement speed of the 2P character 211 is higher than that of the 1P character 201. In addition, the 2P character 211 can also perform "unique actions" that cannot be executed by the 1P character 201. Specifically, the 2P character 211 can "jump" by pressing the X-button 55, for example (the 1P character 201 cannot "jump"). Therefore, the 2P character 211 can "jump" over a terrain having a step, to move forward. Moreover, as other unique movement performance or unique action of the 2P character 211, the 2P character 211 may be able to move on the surface of water by swimming, or may be able to perform an action of "dashing".

[Sight Object]

In FIG. 8, circular sight objects 202 and 212 are displayed on the traveling direction sides of the respective PCs at positions away from the positions of the PCs by predetermined distances. The sight object 202 is a sight object associated with the 1P character 201, and is also an operation target of the first player. Also, the sight object 212 is a sight object associated with the 2P character 211, and is also an operation target of the second player. Hereinafter, the former sight is referred to as "1P sight", and the latter sight is referred to as "2P sight". In addition, both sights are sometimes collectively referred to simply as "sight". In FIG. 8, a straight line image connecting each sight and the PC associated with the sight is also displayed. The straight line image makes it easier to visually grasp which PC sight each sight is. The movement of the sights and the PCs will be described later.

[Association Character Object]

In FIG. 8, a plurality of association character objects (hereinafter, referred to as association objects) are displayed on the rear side in the traveling direction of each PC. The association objects are non-player characters (NPCs) associated with each PC. The association objects are biological character objects that act autonomously to some extent. In addition, basically, the association objects automatically move so as to follow the movement of the PC. Here, the game has a concept of "party". The "party" can be composed of one "leader" and a plurality of "members". The party has to have at least one "leader", but may have no "member". That is, the party can be composed of only a "leader". In the game, each PC can be a "leader". The above association objects are configured as "members". The association objects are scattered on a game field in a state where the association objects do not belong to any party (hereinafter, the characters in this state are referred to as "non-belonging characters"), and the player can add predetermined non-belonging characters to their own party by performing a predetermined operation. In the game, each PC moves in a unit of the "party". In the following description, an association object that is a member of a party having the 1P character 201 as a leader is referred to as "1P association object", and an association object that is a member of a party having the 2P character 211 as a leader is referred to as "2P association object". In the example in FIG. 8, as 1P association objects 203, three association objects are added to the party of the 1P character 201. In addition, as 2P association objects 213, two association objects are added to the party of the 2P character 211.

In the game, the player can also cause the PC operated by the player to "throw" an association object in their own party toward the point at which the sight is located (hereinafter, referred to as "throw action"), by performing a predetermined operation, specifically, pressing the A-button 53. After landing, the thrown association object performs a predetermined action or motion according to the situation therearound. For example, if there is an enemy character near the landing point, the association object "attacks" the enemy character. Also, if there is a material item near the landing point, the association object "collects" the material item.

[Movement Operation Method]

Next, movement operations for the sights and the PCs will be described. For convenience of description, a description will be given assuming that there are two operation modes in the game. Hereinafter, the first operation mode is referred to as "individual operation mode", and the second operation mode is referred to as "joint operation mode". The "individual operation mode" is an operation mode in which each player operates their own PC in multiplay. Meanwhile, the "joint operation mode" is an operation mode for operating a "joint type player object" described later. First, an operation, etc., in the "individual operation mode" will be described, and then the "joint operation mode" will be described.

[Operations in Individual Operation Mode]

Figure 9:
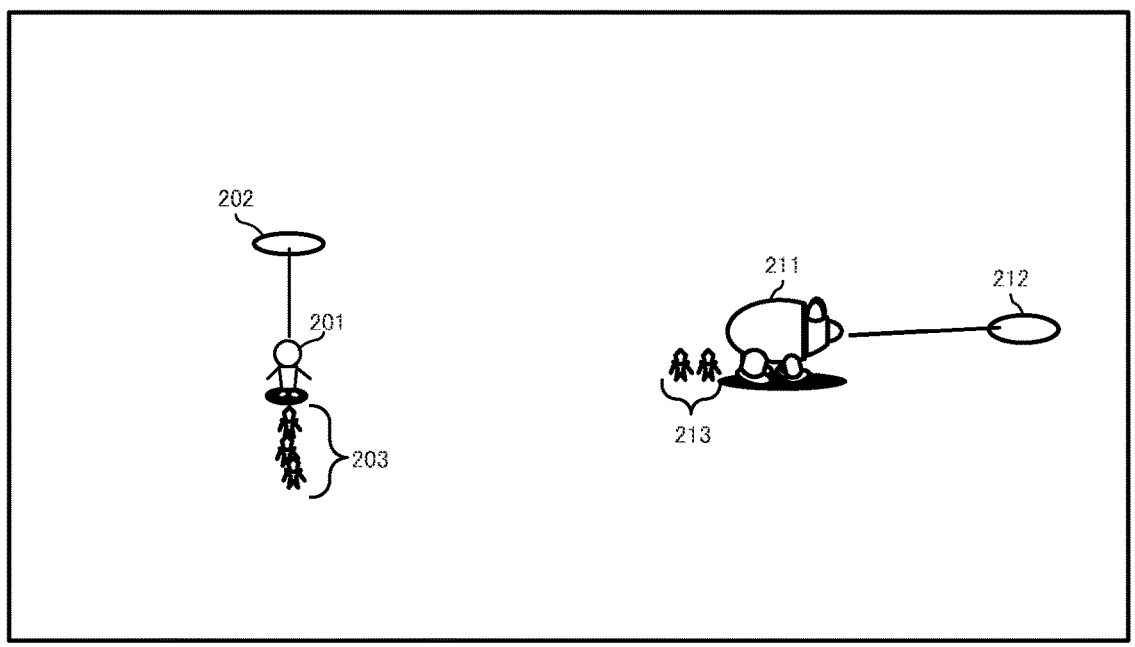
FIG. 9 shows a non-limiting example of the game screen according to the exemplary embodiment.

In the individual operation mode, the first player can perform movement operations for the 1P sight 202 and the 1P character 201, and the second player can perform movement operations for the 2P sight 212 and the 2P character 211. Specifically, each player can move the sight along the ground by operating the left stick 32. That is, control of moving the sight in accordance with the content of an input to the left stick 32 is performed. At this time, if an angle at which the left stick 32 is tilted is equal to or greater than a certain value, control of moving the PC in accordance with the content of the input to the left stick 32 is also performed. That is, while the tilt of the left stick 32 is small, only the sight is moved, and if an input is performed at a tilt having a magnitude equal to or greater than a certain magnitude, the PC can be moved together with the sight (in conjunction with the sight). For example, when the first player performs an input so as to fully tilt the left stick 32 upward from the state in FIG. 8, control of moving the 1P sight 202 and the 1P character 201 upward at the same movement speed is performed in accordance with the upward input. As a result, both the 1P character 201 and the 1P sight 202 move upward in conjunction with each other as shown in FIG. 9. Also, when the second player performs an input so as to fully tilt the left stick 32 rightward from the state in FIG. 8, similarly, both the 2P character 211 and the 2P sight 212 move rightward in conjunction with each other as shown in FIG. 9 (if a positional relationship is established such that both PCs are not within the same single screen, the screen is automatically divided to right and left parts). Moreover, by operating the left stick 32 such that the left stick 32 is not tilted excessively, the player can also finely adjust only the position of the sight while preventing the PC from moving.

Here, in the game, adjustment control in which the relative distance between the sight and the PC does not exceed a certain distance (does not become excessively large) is also performed. For example, control in which the relative distance between the sight and the PC does not exceed 5 m as a distance in the game space is also performed. Specifically, when the relative distance between the sight and the PC reaches 5 m, even if an operation for the sight is performed such that the relative distance exceeds 5 m, control is performed such that the sight does not move any further.

By the above operation and control, control is performed such that the PC moves so as to follow the sight when viewed from the player.

As described above, in the individual operation mode, the player can move the sight and the PC (in conjunction with each other) by operating the left stick 32. In addition, the player can also cause the PC to throw an association object by operating the A-button 53 as described above. Hereinafter, an operation on the left stick 32 for moving the sight is referred to as "first operation method", an operation on the A-button 53 for throwing an association object is referred to as "second operation method", and an operation on the left stick 32 for moving the PC in the individual operation mode (input with a predetermined tilt angle or greater) is referred to as "third operation method".

In the exemplary embodiment, control in which an input by the first operation method is reflected in the movement of the sight and an input by the third operation method is reflected in the movement of the PC is illustrated. That is, control in which the content of the input on the same left stick 32 is distributed to the sight and the PC is performed, resulting in movement that appears such that the PC follows the sight, is exemplified. In this regard, in another exemplary embodiment, control in which the content of the input on the left stick 32 is reflected only in the movement of the sight and the position to which the PC is to move is determined on the basis of the position of the sight, may be performed. In this case as well, movement is performed such that the PC follows the sight.

[Operations in Joint Operation Mode]

Next, operations in the joint operation mode will be described. Before that, the "joint type player object" will be described. In the multiplayer mode of the game, there is a gimmick that the 1P character 201 and the 2P character 211 are joined (integrated) so as to be movable integrally. Specifically, the 1P character 201 can be caused to ride the 2P character 211. To show one example of an operation using a screen example, first, the first player presses the Y button 56 (joining operation) in a state where the 1P character 201 is close to the 2P character 211 to some extent as shown in FIG. 10. Then, representation movement in which the 1P character 201 leaps onto the 2P character 211 is performed as shown in FIG. 11, and a state where the 1P character 201 is mounted on the back of the 2P character 211 is caused as shown in FIG. 12. The "joint type player object" is a player character object that collectively refers to the 1P character 201 and the 2P character 211 in such a state where the 1P character 201 is mounted on the 2P character 211. In other words, the 1P character 201 and the 2P character 211 in a state where the 1P character 201 is mounted on the 2P character 211 are considered as one PC as a whole.

When the 1P character 201 and the 2P character 211 become the above joint type player object as a result of performing the joining operation as described above, the operation mode becomes the joint operation mode. In addition, as for the sight, only the 1P sight 202 is displayed as shown in FIG. 12, and the 1P sight 202 in this state is also a sight associated with the joint type player object (it can also be said that the 1P sight 202 is used as the sight of the joint type player object). Then, in the joint operation mode, the first player can move the 1P sight 202 by operating the left stick 32, and the second player can move the joint type player object by operating the left stick 32. More precisely, when the second player performs a movement operation for the 2P character 211, the 1P character 201 mounted on the 2P character 211 also moves together, and as a result, the joint type player object moves. In this regard, for the second player, the feeling of moving the 2P character 211 is an operation feeling of indirectly moving the 2P character 211 in the individual operation mode, but can be changed to an operation feeling of directly moving the 2P character 211 in the joint operation mode. In other words, in the individual operation mode, for example, if the second player continues to tilt the left stick 32 rightward, the 2P sight 212 is positioned on the right side with respect to the 2P character 211 running rightward. That is, the 2P character 211 reaches a predetermined position in the right direction (in the traveling direction) later than the 2P sight 212. This is considered that the second player is given an impression that the 2P character 211 is chasing the leading 2P sight 212. That is, it can be said that an operation feeling of indirectly moving the 2P character 211 such that the 2P character 211 follows the 2P sight 212 is provided to the 2P character 211. On the other hand, in the joint operation mode, an operation feeling of being able to perform an operation for directly moving the 2P character 211 (joint type player object) with the left stick 32, rather than causing the 2P character 211 to follow the 2P sight 212, is provided.

As described above, in the individual operation mode, two types of movement operations for the movement of the sight and the movement of the PC are performed by each player, but in the joint operation mode, operations can be performed with roles assigned as a role of moving the sight and a role of moving the PC. Therefore, owing to the above control, in the individual operation mode, the movement directions of the sight and the PC are the same, but, in the joint operation mode, the sight and the PC can be moved in different directions. For example, as shown in FIG. 13, the second player can move the joint type player object rightward by operating the left stick 32. Also, at this time, the first player can freely move the 1P sight 202 by operating the left stick 32 (note that the movement range is limited to a range of 5 m as described above). Therefore, the 1P sight 202 can also be moved in a direction different from the movement direction of the joint type player object. In other words, this means that in the joint operation mode, the first player cannot perform a movement operation and the second player cannot perform a sighting operation.

Also, in the joint operation mode, the second player can perform operations for actions (such as jumping) unique to the 2P character 211, as in the individual operation mode.

In the following description, an operation on the left stick 32 for moving the joint type player object is referred to as "fourth operation method". That is, in the joint operation mode, the first player moves the 1P sight 202 by the first operation method, and the second player moves the joint type player object by the fourth operation method.

Here, supplementary description will be given regarding the handling of the sights and the association objects at the time of the above joining (riding). First, as for the sights, representation movement related to the joining (hereinafter, joining movement) is performed when the first player performs the joining operation as described above. At this time, the display of the 2P sight 212 fades out. Then, when the joining movement is completed, a state where only the 1P sight 202 is displayed is caused. In addition, since the 2P sight 212 is not displayed, only the first player can perform an operation for the above throw action in the state as the joint type player object.

Next, as for the handling of the association objects along with the joining, in the exemplary embodiment, association objects that are composed of the 1P association objects 203 and the 2P association objects 213 are handled as association objects associated with the joint type player object. Specifically, in the exemplary embodiment, control in which the association objects belonging to the party of the 1P character are merged into the party of the 2P character 211 and the 2P association objects 213 after the mergence are handled as the association objects of the joint type player object, is performed. For example, as the above joining movement, control in which the three 1P association objects 203 move to the position at which the two 2P association objects 213 are gathered, is performed. Then, when the joining movement is completed, the number of 2P association objects 213 reaches five. Thereafter, the five 2P association objects 213 move so as to follow the movement of the joint type player object. In addition, when the throw action is performed by an operation by the first player, the five 2P association objects 213 become objects to be thrown.

In the exemplary embodiment, the example in which the 1P character 201 rides the 2P character 211 is taken as an example of the joining. In addition to this, the joining may be performed in the following manner. For example, in another exemplary embodiment, the case where two characters are combined or fused into another character with a change in appearance, also corresponds to the joining. Moreover, the case where two characters get into a vehicle object, one of the characters sits in the driver's seat, the other character sits in the passenger's seat, and movement control and the like are performed with the vehicle object as a single object, also corresponds to the joining. Furthermore, as for the movement of two characters, various cases where two characters move integrally may be handled as cases corresponding to the joining.

[Cancellation of Joining]

Next, the case of cancelling the state as the joint type player object will be described. That is, the case of separating the 1P character 201 and the 2P character 211 integrated as the joint type player object will be described. In the exemplary embodiment, in the state as the joint type player object, the state as the joint type player object can be cancelled when the first player performs a predetermined cancellation operation (presses the Y button 56 in this example). For example, when the cancellation operation is performed, representation movement (hereinafter, cancellation movement) in which the 1P character 201 leaps down from the back of the 2P character 211 is performed. As a result, the state as the joint type player object is cancelled as shown in FIG. 14. Accordingly, the operation mode is switched to the individual operation mode, and the 2P sight 212 which has not been displayed is also displayed.

As for the association objects, reformation of a party along with the cancellation of the state as the joint type player object is not performed. That is, even if there is any 1P association object 203 at the time of joining, a state where there is no member in the party of the 1P character 201 is caused as shown in FIG. 14 when the cancellation movement is completed. This is in consideration of the fact that how many association objects are to be associated with the first player depends on the situation at that time. Also, in the exemplary embodiment, only the first player can perform the operations for the joining and the cancellation thereof. On the other hand, the second player may be given a sense of unreasonableness if their own association objects are taken by the first player without permission even though the cancellation is performed by the intention of the first player, and this concern is also taken into consideration. Therefore, at the time of cancellation, the association objects are initially caused not to be associated with any PC, and then the players are allowed to discuss with each other about the necessary number of association objects. For example, the second player may perform an operation for removing one or some of the 2P association objects 213 from the party, and the first player may perform an operation for adding the removed association object(s) to their own party.

In the exemplary embodiment, the second player is blocked from performing the above joining operation and cancellation operation. This is because if it is made possible for the second player to perform these operations, for example, when the first and second players press the Y buttons 56 at almost the same timing, the PCs may be joined and then moved such that the joining is immediately cancelled, which may confuse the players.

As described above, in the multiplayer mode, while each player is operating their own operation target PC, the operation target PC can act as the joint type player object if necessary. As described above, there is a difference in movement performance between the 1P character 201 and the 2P character 211. Therefore, for example, in the case where the 1P character 201 (which cannot jump) cannot move forward alone due to a step in a terrain, the 1P character 201 can move forward by becoming the joint type player object and jumping. In addition, in the state as the joint type player object, the first player can concentrate on the sighting operation, and the second player can concentrate on the movement operation for the joint type player object. Therefore, in a terrain in which there are many steps and drop-off points, at a location where it is impossible to move forward unless jumping movement is frequently used, the second player can concentrate on an operation for jumping movement as a result of becoming the joint type player object. Then, the first player takes charge of the sighting operation (during jumping movement), whereby it can be expected to make it easier to move forward and the fun of cooperative play can be provided to the players.

[Single Play Mode]

Next, the single play mode will be described. In the single play mode in which a player plays the game alone, the player operates the 1P character 201 and the 2P character 211. Specifically, the player can operate either the 1P character 201 or the 2P character 211 as a current operation target. Then, the current operation target can be switched by performing an operation for switching the operation target (hereinafter, operation target switching operation). For example, when the 1P character 201 is the operation target, a screen is displayed as shown in FIG. 15. In FIG. 15, a game image in which the 1P character 201 is located substantially at the center of the screen is displayed. The operations at this time are the same as those in the individual operation mode described above. Then, when the player performs the operation target switching operation, the operation target is switched to the 2P character 211. As a result, a game image in which the 2P character 211 is located substantially at the center of the screen is displayed as shown in FIG. 16 (the virtual camera moves or is switched to a camera for the 2P character 211). In addition, at this time, the 1P character 201 which is the operation target before switching waits at that place. Similarly, when the operation target is switched from the 2P character 211 to the 1P character 201, the 2P character 211 waits at that place.

Also, in the single play mode as well, each PC can be brought into a state as a joint type player object as described above. However, since there is only one player, the above assignment of operations is impossible. In this case, an input to the left stick 32 is used to control the movement of the 1P sight 202 (the sight of the joint type player object) and to control the movement of the 2P character 211 (the joint type player object). That is, as the movement operation methods for the sights and the PCs, the same operation methods as those in the individual operation mode are provided even in the state as the joint type player object. Therefore, the same operability as that in the above individual operation mode is provided to the player even in the state as the joint type player object. In the state as the joint type player object, the player can also cause the joint type player object to perform the above-described actions unique to the 2P character. Therefore, for example, in the case where the player desires to go over a terrain having a step, the player can cause the two characters to go over the step together by causing the two characters to become the joint type player object and move by jumping.

When joining is cancelled in the single play mode, the operation target after the cancellation is set to the 1P character 201.

Figure 18:
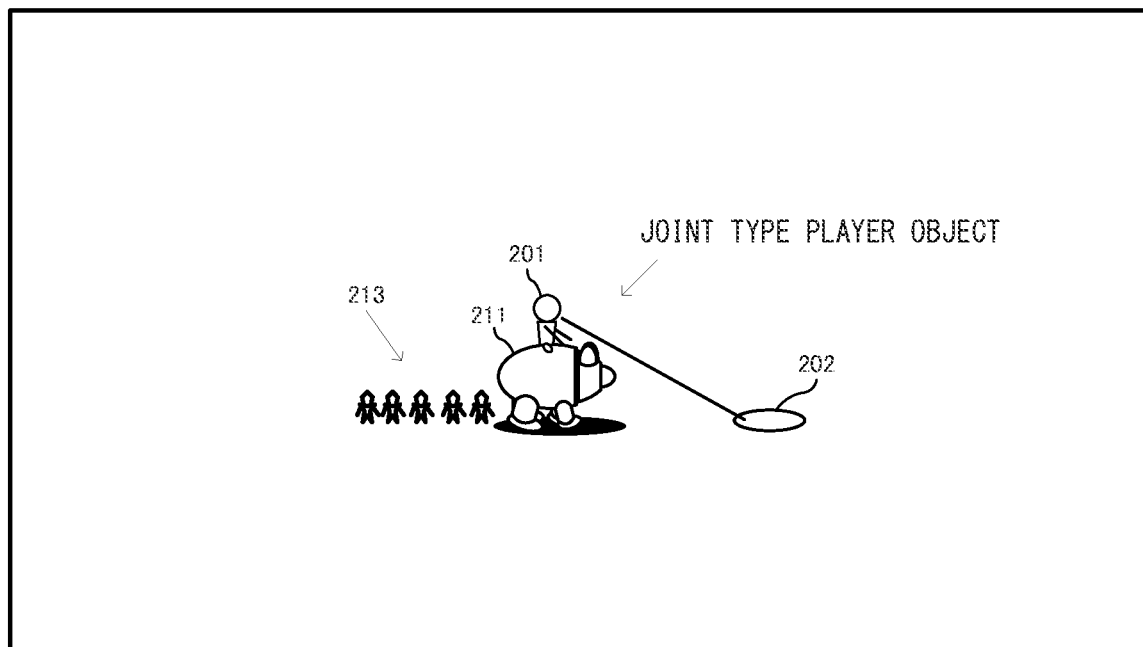
FIG. 18 shows a non-limiting example of the game screen according to the exemplary embodiment.
Figure 19:
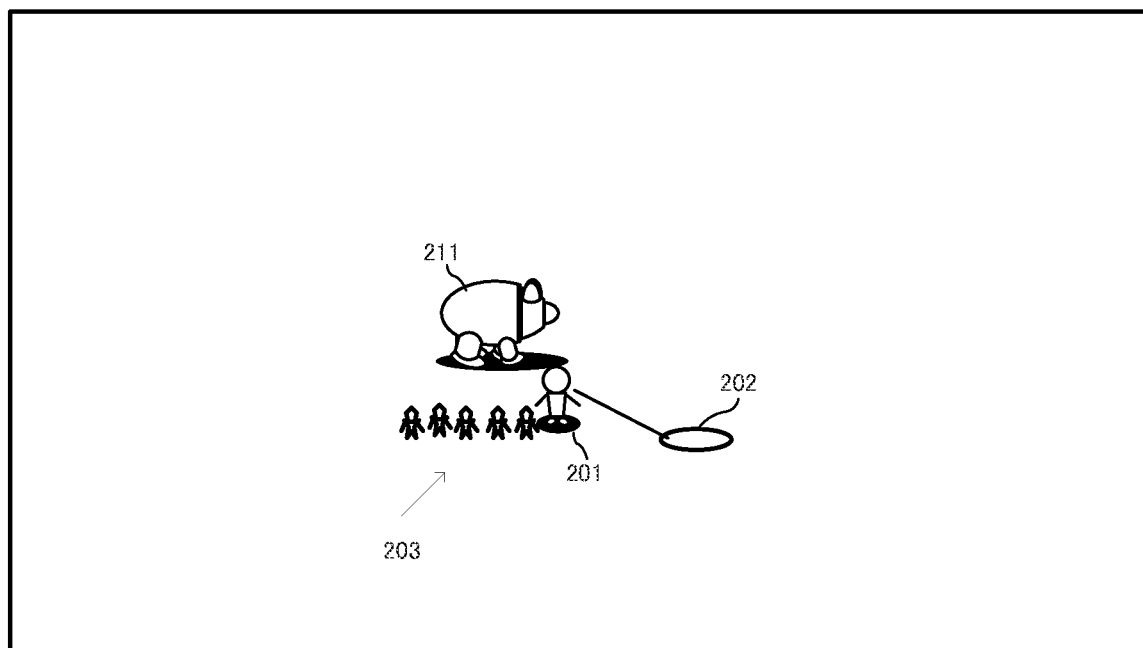
FIG. 19 shows a non-limiting example of the game screen according to the exemplary embodiment.

As for the belonging of the association objects in the single play mode, first, when becoming the joint type player object, the 1P association objects 203 are merged into the 2P association objects 213. For example, as shown in FIG. 17, in a state before becoming the joint type player object, there are three 1P association objects 203, and there are two 2P association objects 213. When the joint type player object is formed from this state, the 1P association objects 203 are merged into the 2P association objects 213 as shown in FIG. 18. As a result, the number of 2P association objects 213 becomes five in total. Meanwhile, when the joining is cancelled, in the exemplary embodiment, the 2P association objects 213 are all caused to belong to the party of the 1P character 201 as 1P association objects 203 as shown in FIG. 19. This is to, while the operation target is set to the 1P character 201 after the cancellation as described above, make it possible to perform the above-described throw action immediately after the cancellation.

As described above, in the single play mode, one player can perform operations while switching the operation target between the 1P character 201 and the 2P character 211. Although there is a difference in movement performance between both characters as described above, it is also possible to take advantage of the movement performance of the 2P character 211, which the 1P character 201 does not have. Furthermore, in the single play mode as well, the joint type player object can be used. Moreover, in the single play mode, the movement operation methods for the sights and the PCs remain the same regardless of whether or not the current state is a state as the joint type player object. That is, the operability is the same before and after the state as the joint type player object, so that the player can continue to play the game without being confused about the operations. This can also be said to be as follows from the viewpoint of how to operate the joint type player object. Specifically, this can also be said that in the single play mode, the operation methods are methods in which sighting and movement are performed in conjunction (the above first and third operation methods), but in the multiplayer mode, the operation methods are methods in which sighting and movement are independent of each other (the above first and fourth operation methods).

[Details of Game Processing of Exemplary Embodiment]

Next, the game processing in the exemplary embodiment will be described in detail with reference to FIG. 20 to FIG. 40.

[Data to be Used]

Figure 20:
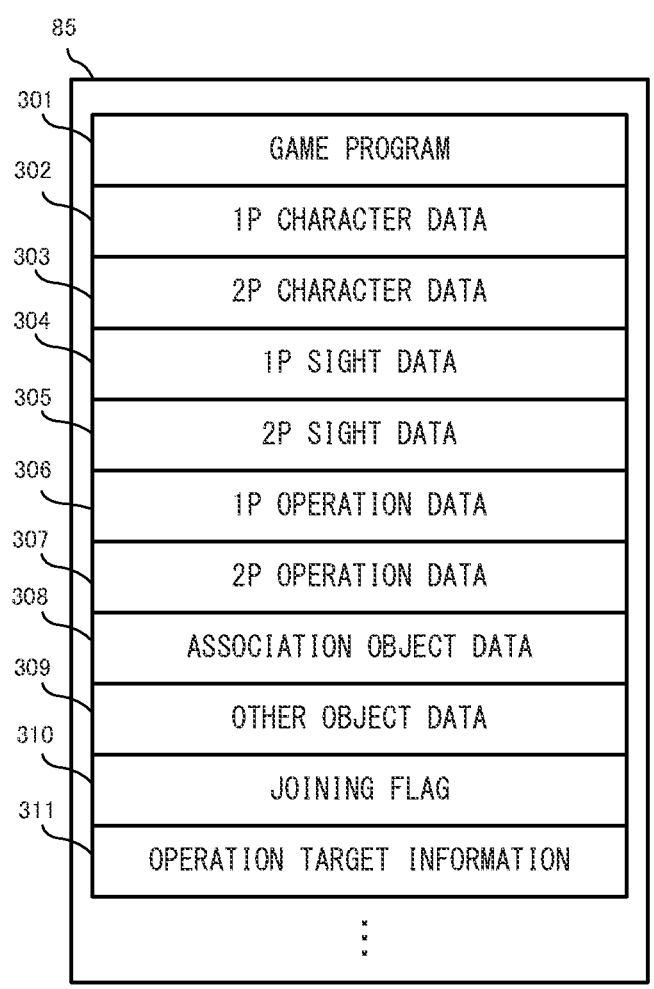
FIG. 20 illustrates a memory map showing a non-limiting example of various kinds of data stored in a DRAM 85.

First, various kinds of data to be used in the game processing will be described. FIG. 20 illustrates a memory map showing an example of various kinds of data stored in the DRAM 85 of the main body apparatus 2. In the DRAM 85 of the main body apparatus 2, a game program 301, 1P character data 302, 2P character data 303, 1P sight data 304, 2P sight data 305, 1P operation data 306, 2P operation data 307, association object data 308, other object data 309, a joining flag 310, operation target information 311, etc., are stored.

The game program 301 is a program for executing the game processing in the exemplary embodiment.

Figure 21:
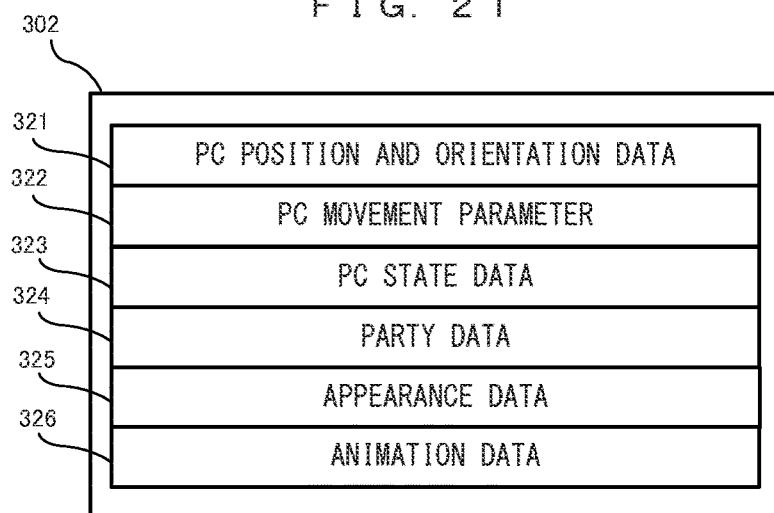
FIG. 21 shows a non-limiting example of 1P character data 302.

The 1P character data 302 is data regarding the above 1P character 201. FIG. 21 shows an example of the data structure of the 1P character data 302. The 1P character data 302 includes at least PC position and orientation data 321, a PC movement parameter 322, PC state data 323, party data 324, appearance data 325, and animation data 326.

The PC position and orientation data 321 is data indicating the current position and the current orientation of the 1P character 201 in the virtual game space. For example, as information indicating the current position, three-dimensional coordinates in the virtual game space are stored in the PC position and orientation data 321. In addition, as information indicating the current orientation of the 1P character 201, vector data indicating vectors in x-, y-, and z-axes in a local coordinate system of the 1P character 201, etc., are stored in the PC position and orientation data 321.

The PC movement parameter 322 is data used to control the movement of the 1P character 201. For example, the PC movement parameter 322 includes parameters indicating the movement direction, the movement speed, etc., of the 1P character 201.

The PC state data 323 is data indicating a PC state which is the current state of the 1P character 201. In the PC state data 323, for example, data indicating the following PC states can be set as appropriate according to the situation of the game.

Waiting: a state where the 1P character 201 is waiting without performing any other action such as moving.

Moving: a state where the 1P character 201 is moving.

Middle of joining: a state from the start of the joining movement in response to a joining instruction to the completion thereof, that is, a state from the start of the 1P character 201 riding the 2P character 211 to the completion thereof.

Middle of cancellation: a state from the start of the above cancellation movement to the completion thereof after a cancellation instruction is performed, that is, a state until the 1P character 201 gets off from the 2P character 211.

Throwing: a state where the 1P character 201 is performing an action related to the above throwing.

Riding: a state as the joint type player object (a state where the 1P character 201 is mounted on the 2P character 211) where the 1P character 201 is not performing a throwing action.

Throwing during riding: a state as the joint type player object where the 1P character 201 is performing a throwing action. In addition to the above, data indicating various other PC states corresponding to situations of the game can be set as appropriate.

The party data 324 is data that defines the details of a party having the 1P character 201 as a leader. The party data 324 includes at least information for specifying the association objects added to the party.

The appearance data 325 is data for forming the appearance of the 1P character 201 such as three-dimensional model data and texture data of the 1P character 201.

The animation data 326 is data that defines animations of various actions performed by the 1P character 201. Specifically, data of animations corresponding to the above character states are defined. For example, data of an action animation in which the 1P character 201 runs is defined as corresponding to "moving". Also, for example, data of an action animation in which the 1P character 201 leaps onto the back of the 2P character 211 is defined as corresponding to "middle of joining". Also, for example, data of an action animation in which the 1P character 201 leaps down from the 2P character 211 and lands on the ground is defined as corresponding to "middle of cancellation". In addition, the animation data 326 includes various animation data corresponding to other character states.

Referring back to FIG. 20, the 2P character data 303 is data regarding the above 2P character 211. The data structure of the 2P character data 303 is the same as that of the 1P character data 302, except that the target is the 2P character 211, and thus the detailed description thereof is omitted. As for the PC state data 323, since the 2P character 211 can also perform the unique actions which cannot be performed by the 1P character 201, a character state indicating that a unique action is being executed such as "jumping" or "dashing" can also be set.

Figure 22:
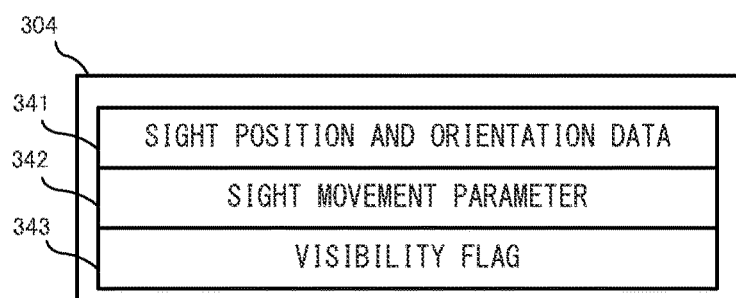
FIG. 22 shows a non-limiting example of 1P sight data 304.

The 1P sight data 304 is data regarding the above 1P sight. FIG. 22 shows an example of the data structure of the 1P sight data 304. The 1P sight data 304 includes at least sight position and orientation data 341, a sight movement parameter 342, and a visibility flag 343. The sight position and orientation data 341 is data indicating the current position and the current orientation of the 1P sight 202 in the virtual game space. The sight movement parameter 342 is various parameters (movement direction, movement speed, etc.) for moving the sight. The visibility flag 343 is a flag for indicating whether or not to display the 1P sight 202 on the screen.

Referring back to FIG. 20, the 2P sight data 305 is data regarding the above 2P sight. The data structure of the 2P sight data 305 is the same as that of the 1P sight data 304, and thus the detailed description thereof is omitted.

Figure 23:
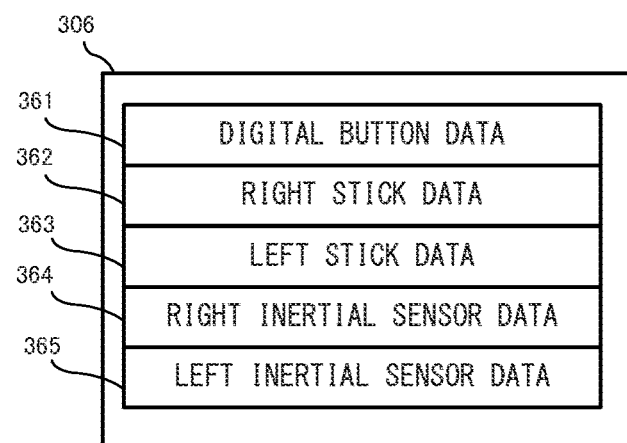
FIG. 23 shows a non-limiting example of 1P operation data 306.

The 1P operation data 306 is data obtained from the controller operated by the first player. That is, the 1P operation data 306 is data indicating the content of an operation performed by the first player. FIG. 23 illustrates an example of the data structure of the 1P operation data 306. The 1P operation data 306 includes at least digital button data 361, right stick data 362, left stick data 363, right inertial sensor data 364, and left inertial sensor data 365. The digital button data 361 is data indicating pressed states of various buttons of the controllers. The right stick data 362 is data for indicating the content of an operation on the right stick 52. Specifically, the right stick data 362 includes two-dimensional data of x and y. The left stick data 363 is data for indicating the content of an operation on the left stick 32. The right inertial sensor data 364 is data indicating the detection results of the inertial sensors such as the acceleration sensor 114 and the angular velocity sensor 115 of the right controller 4. Specifically, the right inertial sensor data 364 includes acceleration data for three axes and angular velocity data for three axes. The left inertial sensor data 365 is data indicating the detection results of the inertial sensors such as the acceleration sensor 104 and the angular velocity sensor 105 of the left controller 3.

Referring back to FIG. 20, the 2P operation data 307 is data obtained from the controller operated by the second player. That is, the 2P operation data 307 is data indicating the content of an operation performed by the second player. The data structure of the 2P operation data 307 is the same as that of the 1P operation data 306, and thus the description thereof is omitted.

The association object data 308 is data regarding the above association objects. The association object data 308 is a database consisting of a set of records each including items shown in FIG. 24. In FIG. 24, each record includes items such as an association object ID 381, a current position 382, a current orientation 383, an association character state 384, an association movement parameter 385, and a belonging party 386. The association object ID 381 is an ID for uniquely identifying each association object. The current position 382 and the current orientation 383 are information indicating the current position and the current orientation of the association object in the virtual game space. The association character state 384 is information indicating the current state of the association object (e.g., waiting, moving, throwing, etc.). The association movement parameter 385 is various parameters used to control the movement of the association object. The belonging party 386 is information indicating the party to which the association object currently belongs (PC with which the association object is associated). In the belonging party 386, for example, "1P character", "2P character", or "non-belonging" is set.

Referring back to FIG. 20, the other object data 309 is data of various objects (e.g., enemy characters) other than the PCs and the association objects.

The joining flag 310 is a flag for indicating whether or not the current state is a state as the joint type player object. In addition, the joining flag 310 is also a flag indicating whether the operation mode is the individual operation mode or the joint operation mode. While the current state is the state as the joint type player object, the joining flag 310 is set to be ON. When the joining flag 310 is ON, it indicates that the operation mode is the joint operation mode.

The operation target information 311 is data used in the single play mode, and is information indicating the current operation target of the player. In the exemplary embodiment, information indicating the 1P character 201, the 2P character 211, or the joint type player object is set. At the start of the game in the single play mode, the 1P character 201 is set in the operation target information 311.

In addition, various kinds of data required for the game processing are also generated as appropriate and stored in the DRAM 85.

[Details of Processing Executed by Processor 81]

Next, the details of the game processing in the exemplary embodiment will be described. Here, control related to the above-described movement operations will be mainly described, and the description of various other types of game processing is omitted. Moreover, after processing in the multiplayer mode is described, processing in the single play mode will be described. Also, flowcharts described below are merely an example of the processing. Therefore, the order of each process step may be changed as long as the same result is obtained. In addition, the values of variables and thresholds used in determination steps are also merely examples, and other values may be used as necessary.

[Details of Processing in Multiplayer Mode]

FIG. 25 is a flowchart showing the details of multiplayer mode processing according to the exemplary embodiment. The processing related to this flowchart is started, for example, in accordance with an operation for starting multiplay being performed from a predetermined menu. In addition, a process loop of steps S1 to S8 in FIG. 25 is repeatedly executed every frame period.

[1P-Side Operation Process]

Figure 26:
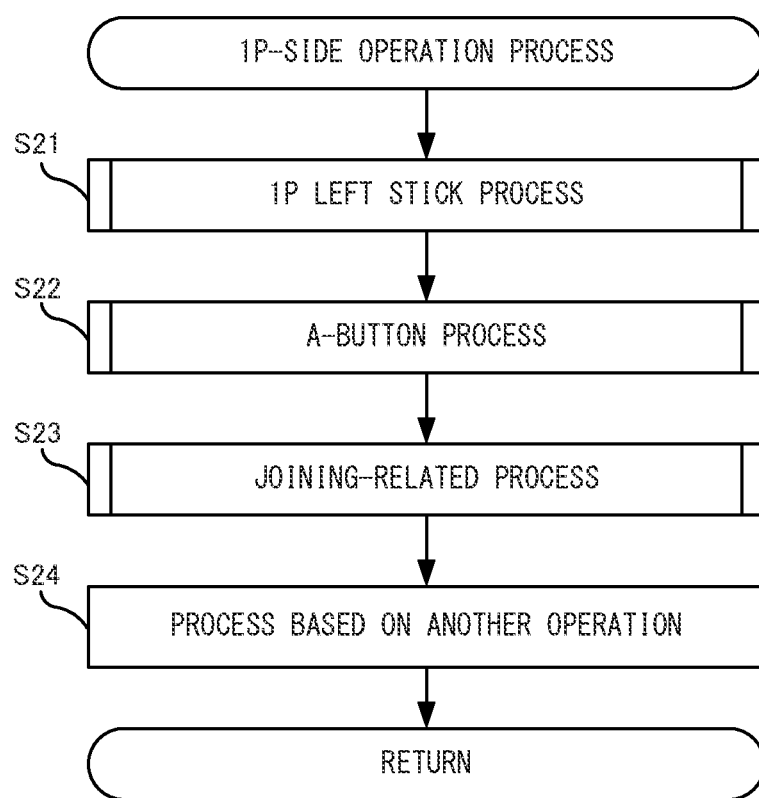
FIG. 26 is a non-limiting example flowchart showing the details of a 1P-side operation process.

After play of the game is started, first, in step S1, the processor 81 executes a 1P-side operation process. In this process, a process for reflecting the content of an operation by the first player in the movement of the 1P character 201, etc., is performed. FIG. 26 is a flowchart showing the details of the 1P-side operation process. First, in step S21, the processor 81 executes a 1P left stick process. In this process, a process based on a left stick operation by the first player, that is, a process based on the first operation method and the third operation method, is performed.

Figure 27:
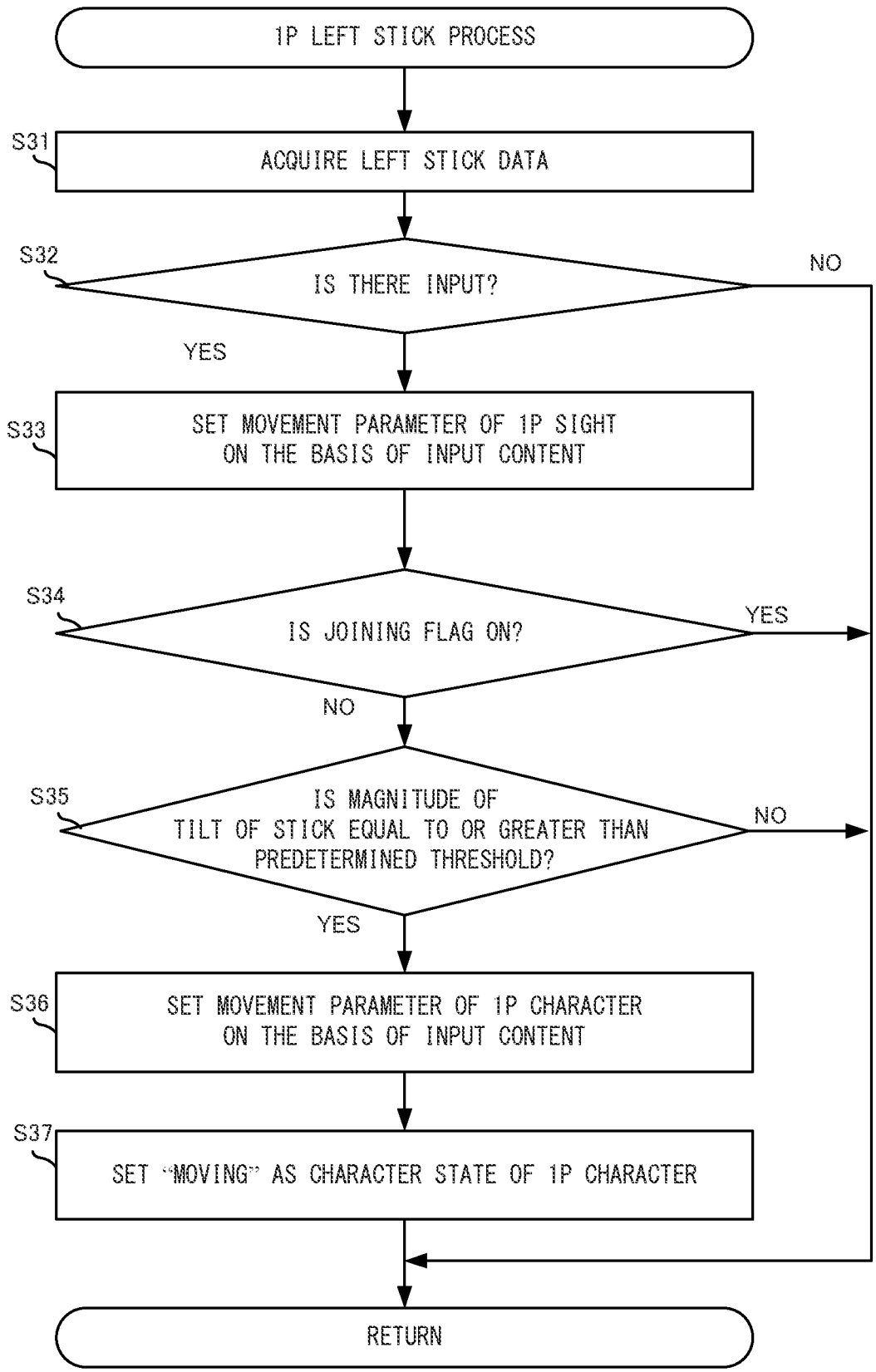
FIG. 27 is a non-limiting example flowchart showing the details of a 1P left stick process.

FIG. 27 is a flowchart showing the details of the 1P left stick process. In FIG. 27, first, in step S31, the processor 81 acquires the left stick data 363 from the 1P operation data 306. Next, in step S32, the processor 81 determines whether or not there is an input to the left stick 32, on the basis of the left stick data 363. As a result of the determination, if such an input has not been performed (NO in step S32), the processor 81 ends the 1P left stick process.

On the other hand, if any input has been performed on the left stick 32 (YES in step S32), next, in step S33, the processor 81 sets the sight movement parameter 342 of the 1P sight 202 on the basis of the content of the input indicated by the left stick data 363 (this is a process based on the first operation method).

Next, in step S34, the processor 81 determines whether or not the joining flag 310 is ON. If the joining flag 310 is ON (YES in step S34), the processor 81 ends the 1P left stick process. That is, if the joining flag 310 is ON, it means that the operation mode is the joint operation mode, so that, for the first player, only a process based on the first operation method is performed.

On the other hand, if the joining flag 310 is not ON (NO in step S34), a process based on the third operation method is also subsequently performed. First, in step S35, the processor 81 determines whether or not the magnitude (tilt angle) of the tilt of the left stick 32 related to the current input is equal to or greater than a predetermined threshold. That is, whether or not a tilt input that is large to some extent has been performed is determined. As a result of the determination, if the magnitude (tilt angle) is not equal to or greater than the predetermined threshold (NO in step S35), the processor 81 ends the 1P left stick process. That is, if an input having a small tilt has been performed, a process in which the 1P character 201 is not moved is performed.

On the other hand, if a tilt input having a magnitude equal to or greater than the predetermined threshold has been performed (YES in step S35), in step S36, the processor 81 sets the PC movement parameter 322 of the 1P character 201 on the basis of the content of the input indicated by the left stick data 363 (this is a process based on the third operation method). As a result, the movement of the 1P sight 202 and the 1P character 201 can be controlled on the basis of the content of the input indicated by the left stick data 363. As a result, the movement directions of the 1P sight 202 and the 1P character 201 can coincide with each other. For example, if the left stick 32 is tilted leftward when the 1P sight 202 and the 1P character 201 are moving rightward, the 1P sight 202 moves leftward so as to quickly overtake the 1P character 201, and then both the 1P sight 202 and the 1P character 201 move leftward. In addition, as for the movement speed thereof, if a tilt input having a magnitude equal to or greater than the predetermined threshold has been performed on the left stick 32, the movement speed of the 1P sight 202 and the 1P character 201 is increased in accordance with the magnitude of the tilt. That is, as for the movement speed, it can be said that there is a correlation between the 1P sight 202 and the 1P character 201. Therefore, it can be said that the 1P character 201 and the 1P sight 202 have a relationship of moving in conjunction with each other.

Next, in step S37, the processor 81 sets "moving" in the PC state data 323 of the 1P character 201. Then, the processor 81 ends the 1P left stick process.

Referring back to FIG. 26, next, in step S22, the processor 81 executes an A-button process. In this process, a process based on the second operation method is performed. FIG. 28 is a flowchart showing the details of the A-button process. First, in step S41, the processor 81 acquires the digital button data 361 from the 1P operation data 306.

Next, in step S42, the processor 81 determines whether or not there is an input to the A-button 53. As a result of the determination, if there is no input to the A-button 53 (NO in step S42), the processor 81 ends the A-button process.

On the other hand, if an input to the A-button 53 has been performed (YES in step S42), a process for executing the above throw action is performed. First, in step S43, the processor 81 selects an association object to be thrown. At this time, if the current state is a state as the joint type player object (the current operation mode is the joint operation mode), an association object to be thrown is selected from the party of the 2P character 211. As described above, when the joint type player object is formed, the 1P association objects 203 are merged into the 2P association objects 213, so that the 2P association objects 213 are targets of the throw action while the joint type player object is formed. On the other hand, if the current state is not a state as the joint type player object (the current operation mode is the individual operation mode), an association object to be thrown is selected from the party corresponding to each PC. For example, when the 1P character 201 performs the throw action, an association object to be thrown is selected from among the 1P association objects 203. The method for selecting an association object to be thrown may be any method, but, for example, the association object closest to the 1P character 201 may be selected.

Next, in step S44, the processor 81 sets the association movement parameter 385 for the association object to be thrown, such that the current position of the 1P sight 202 is the destination (landing point) of the association object to be thrown. For example, a movement trajectory along which the association object moves to the destination so as to draw a parabolic line is set in the association movement parameter 385.

Next, in step S45, the processor 81 sets, in the association character state 384 of the selected association object, "throwing" indicating a state where the association object is moving toward the destination by throwing. Then, the processor 81 ends the A-button process.

[Joining-Related Process]

Figure 29:
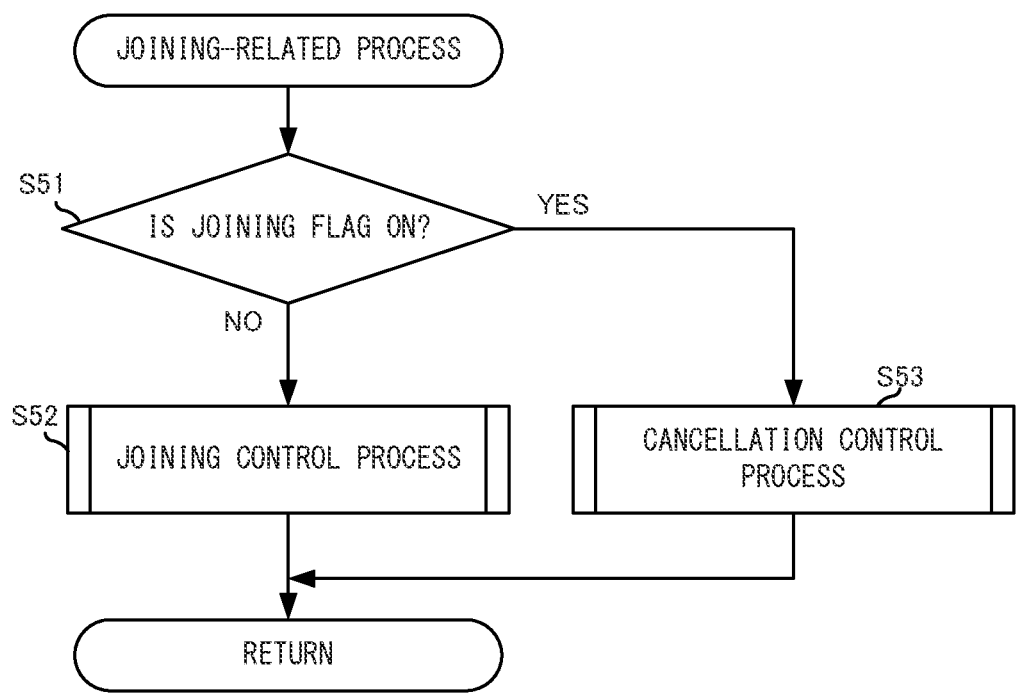
FIG. 29 is a non-limiting example flowchart showing the details of a joining-related process.

Referring back to FIG. 26, next, in step S23, the processor 81 executes a joining-related process. In this process, mainly, a process related to the joining operation and the cancellation operation for joining (both are operations on the Y button 56) is executed. FIG. 29 is a flowchart showing the details of the joining-related process. In FIG. 29, first, in step S51, the processor 81 determines whether or not the joining flag 310 is ON. As a result of the determination, if the joining flag 310 is OFF (NO in step S51), in step S52, the processor 81 executes a joining control process. On the other hand, if the joining flag 310 is ON (YES in step S51), in step S53, the processor 81 executes a cancellation control process. Then, the processor 81 ends the joining-related process. Hereinafter, the joining control process and the cancellation control process will be described.

[Process when Becoming Joint Type Player Object]

Figure 30:
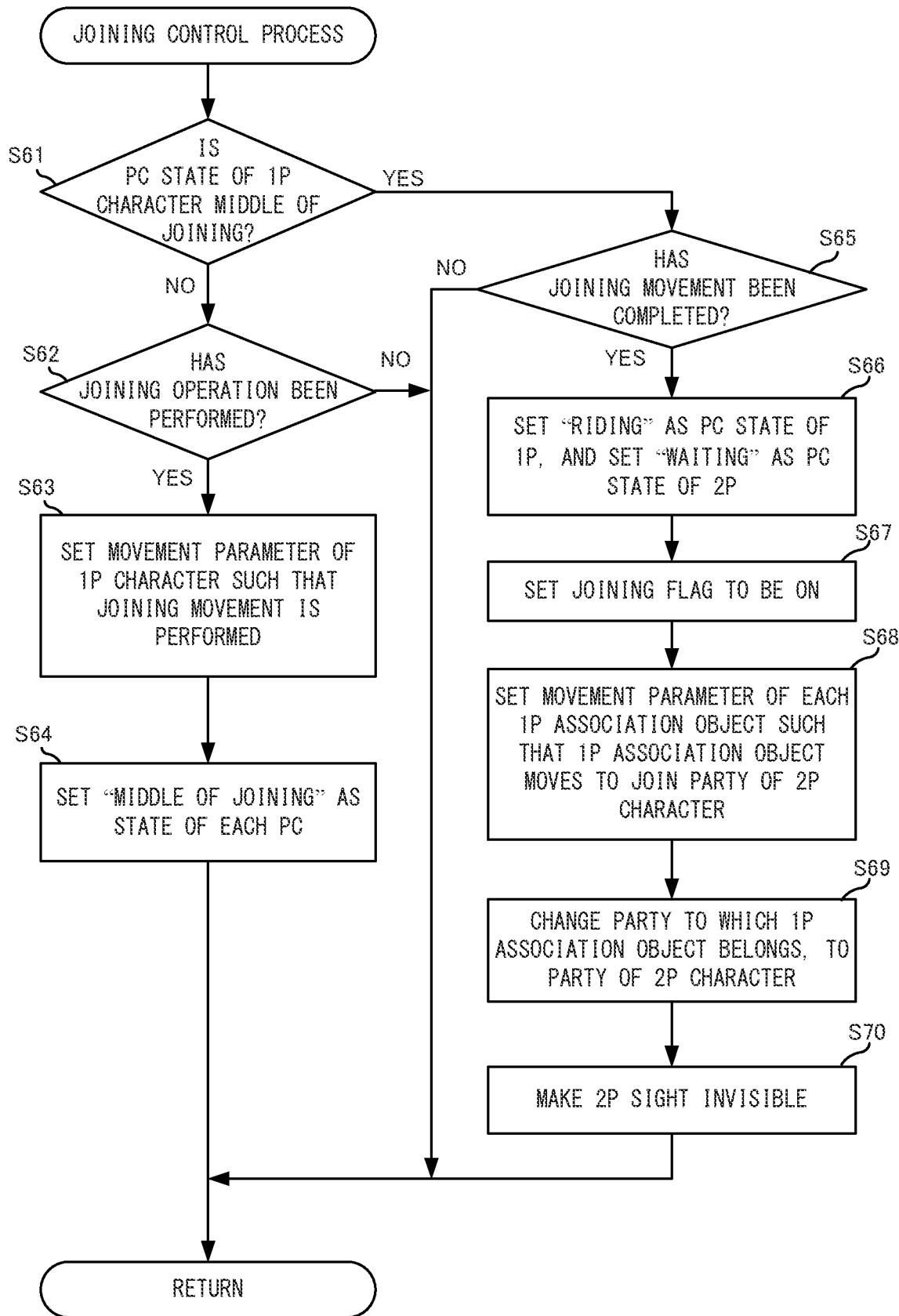
FIG. 30 is a non-limiting example flowchart showing the details of a joining control process.

FIG. 30 is a flowchart showing the details of the joining control process related to step S52 above. First, in step S61, the processor 81 refers to the PC state data 323 of the 1P character 201 and determines whether or not the PC state is "middle of joining". As a result of the determination, if the state of the 1P character 201 is not "middle of joining" (NO in step S61), in step S62, the processor 81 refers to the digital button data 361 of the 1P operation data 306 and determines whether or not the above joining operation has been performed. In the exemplary embodiment, if the Y button 56 is pressed in a state where the 2P character 211 is close to the 1P character 201 as described above, it is determined that the joining operation has been performed. As a result of the determination, if the joining operation has not been performed (NO in step S62), the processor 81 ends the joining control process. On the other hand, if the joining operation has been performed (YES in step S62), in step S63, the processor 81 sets the PC movement parameter 322 of the 1P character 201 such that the 1P character 201 performs an action related to the joining movement. In this example, a movement trajectory along which the 1P character 201 leaps onto the back of the 2P character 211 as described above is set in the PC movement parameter 322.

Next, in step S64, the processor 81 sets "middle of joining" in the PC state data 323 of each of the 1P character 201 and the 2P character 211. Then, the processor 81 ends the joining control process.

On the other hand, as a result of the determination in step S61 above, if the PC state of the 1P character 201 is "middle of joining" (YES in step S61), next, in step S65, the processor 81 determines whether or not the above joining movement has been completed. In the case of this example, whether or not the 1P character 201 has moved to the back of the 2P character 211 is determined. As a result of the determination, if the joining movement has not been completed yet (NO in step S65), the processor 81 ends the joining control process (in subsequent processing, an animation related to the currently executed joining movement is continued). On the other hand, if the joining movement has been completed (YES in step S65), in step S66, the processor 81 sets "riding" in the PC state data 323 of the 1P character 201. In addition, the processor 81 sets "waiting" in the PC state data 323 of the 2P character 211. Therefore, in this example, immediately after causing a state as the joint type player object, the 2P character 211 comes into a "waiting" state once.

Next, in step S67, the processor 81 sets the joining flag 310 to be ON.

Next, a process for adding the 1P association objects 203 to the party of the 2P character 211 is performed. First, in step S68, the processor 81 sets the association movement parameter 385 of each 1P association object 203 such that the 1P association object 203 moves to join the party of the 2P character 211. In addition, along with this, the processor 81 sets "moving" in the association character state 384.

Furthermore, in step S69, the processor 81 changes the belonging party 386 of the 1P association object 203 to "2P character".

The timing to perform the process for adding the 1P association objects 203 to the party of the 2P character 211 is not limited to the time of completion of the joining movement, and this process may be started when the joining operation is performed.

Next, in step S70, the processor 81 sets the visibility flag 343 of the 2P sight data 305 to be OFF. That is, setting in which the 2P sight 212 is not displayed in a state as the joint type player object is performed. Then, the processor 81 ends the joining control process.

[Process when Cancelling Joint Type Player Object]

Figure 31:
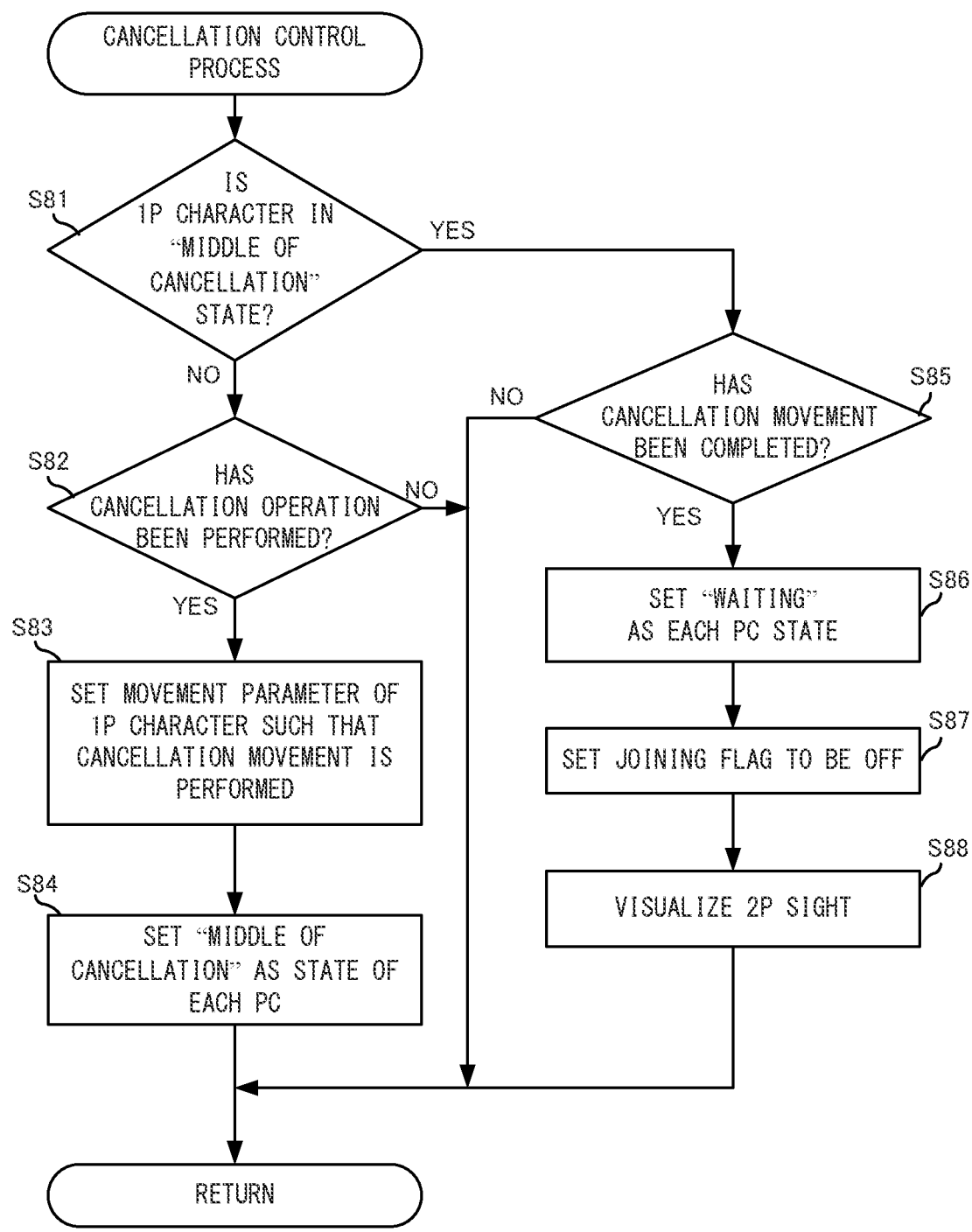
FIG. 31 is a non-limiting example flowchart showing the details of a cancellation control process.

Next, the cancellation control process related to step S53 above will be described. FIG. 31 is a flowchart showing the details of the cancellation control process. In FIG. 31, first, in step S81, the processor 81 refers to the PC state data 323 of the 1P character 201 and determines whether or not the PC state is "middle of cancellation". As a result of the determination, if the PC state is not "middle of cancellation" (NO in step S81), in step S82, the processor 81 refers to the digital button data 361 of the 1P operation data 306 and determines whether or not the above cancellation operation has been performed. As a result of the determination, if the cancellation operation has not been performed (NO in step S82), the processor 81 ends the cancellation control process.

On the other hand, if the cancellation operation has been performed (YES in step S82), in step S83, the processor 81 sets the PC movement parameter 322 such that the 1P character 201 performs the above cancellation movement. In this example, a movement trajectory along which the 1P character 201 leaps down from the back of the 2P character 211 is set in the PC movement parameter 322.

Next, in step S84, the processor 81 sets "middle of cancellation" in the PC state data 323 of each of the 1P character 201 and the 2P character 211. Then, the processor 81 ends the cancellation control process.

On the other hand, as a result of the determination in step S81 above, if the PC state of the 1P character 201 is "middle of cancellation" (YES in step S81), next, in step S85, the processor 81 determines whether or not the cancellation movement has been completed. In this example, when the 1P character 201 leaping down from the back of the 2P character 211 lands on the ground, it is determined that the cancellation movement has been completed. As a result of the determination, if the cancellation movement has not been completed yet (NO in step S85), the processor 81 ends the cancellation control process (in subsequent processing, an action related to the currently executed cancellation movement is continued). On the other hand, if the cancellation movement has been completed (YES in step S85), next, in step S86, the processor 81 sets "waiting" in the PC state data 323 of each of the 1P character 201 and the 2P character 211. Therefore, in this example, immediately after the state as the joint type player object is cancelled, both the 1P character 201 and the 2P character 211 come into a "waiting" state once.

Next, in step S87, the processor 81 sets the joining flag 310 to be OFF.

Next, in step S88, the processor 81 sets the visibility flag 343 of the 2P sight data 305 to be ON. Accordingly, along with the cancellation of the state as the joint type player object, the 2P sight 212 is displayed on the screen. Then, the processor 81 ends the cancellation control process.

[Process Based on Other Operation]

Referring back to FIG. 26, subsequent to the joining-related process, in step S24, the processor 81 executes a process based on another operation. In this process, a process based on an operation other than the above-described left stick operation, A-button operation, and Y-button operation (the joining operation and the cancellation operation for joining) is executed as appropriate. For example, if the B-button 54 is pressed, a process of causing the association objects of the own party to gather at one place is performed. Then, the processor 81 ends the 1P-side operation process.

[2P-Side Process]

Figure 32:
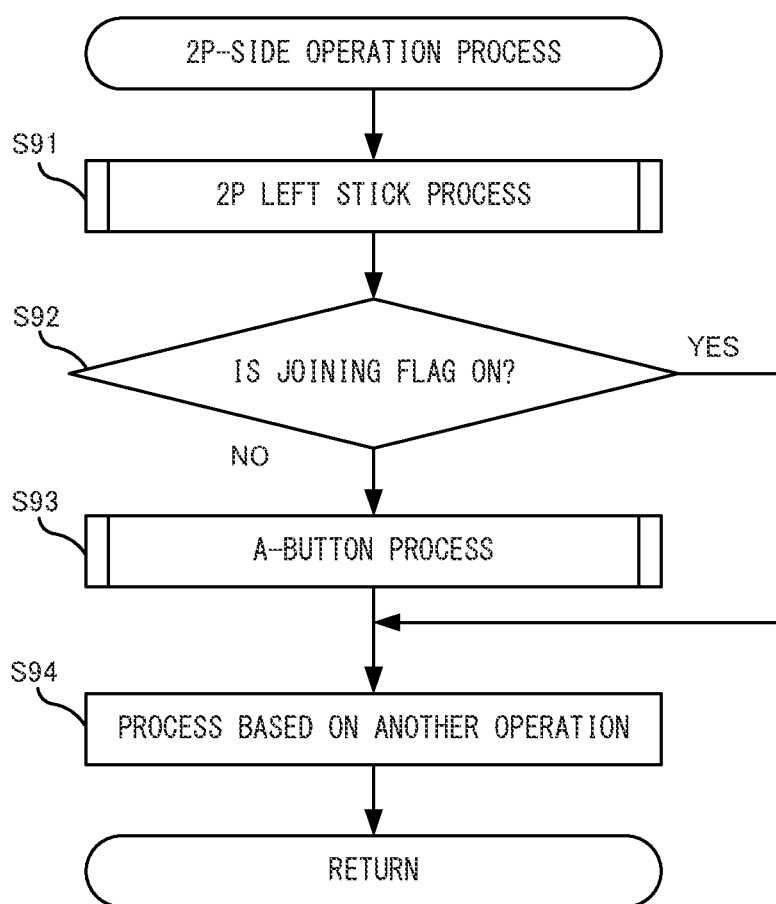
FIG. 32 is a non-limiting example flowchart showing the details of a 2P-side operation process.

Referring back to FIG. 25, next, in step S2, the processor 81 executes a 2P-side operation process. In this process, a process for reflecting the content of an operation by the second player in the movement of the 2P character 211, etc., is performed. FIG. 32 is a flowchart showing the details of the 2P-side operation process. First, in step S91, the processor 81 executes a 2P left stick process. In this process, a process based on a left stick operation by the second player is performed. That is, a process based on the above first operation method, third operation method, and fourth operation method is performed.

Figure 33:
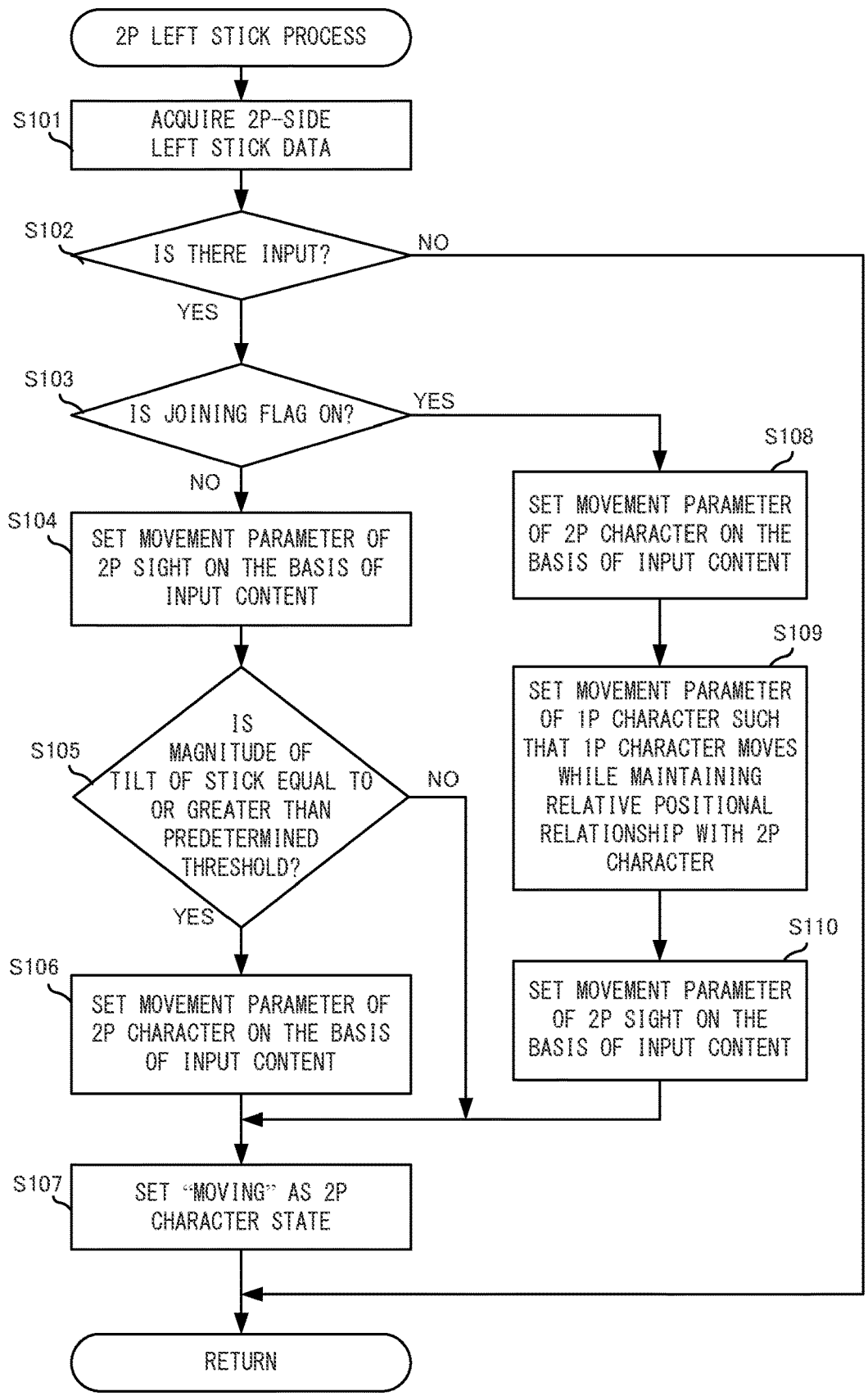
FIG. 33 is a non-limiting example flowchart showing the details of a 2P left stick process.

FIG. 33 is a flowchart showing the details of the 2P left stick process. In FIG. 33, first, in step S101, the processor 81 acquires the left stick data 363 from the 2P operation data 307. Next, in step S102, the processor 81 determines whether or not there is an input to the left stick 32, on the basis of the left stick data 363. As a result of the determination, if such an input has not been performed (NO in step S102), the processor 81 ends the 2P left stick process.

On the other hand, if any input has been performed on the left stick 32 (YES in step S102), next, in step S103, the processor 81 determines whether or not the joining flag 310 is ON. As a result of the determination, if the joining flag 310 is not ON (NO in step S103), it means that the current operation mode is the individual operation mode. In this case, a process for moving the 2P sight 212 and the 2P character 211 is performed on the basis of the left stick operation by the second player. Specifically, first, in step S104, the processor 81 sets the sight movement parameter 342 of the 2P sight 212 on the basis of the content of the input indicated by the left stick data 363 (this is a process based on the first operation method).

Next, in step S105, the processor 81 determines whether or not the magnitude (tilt angle) of the tilt of the left stick 32 related to the current input is equal to or greater than a predetermined threshold. As a result of the determination, if the magnitude (tilt angle) is not equal to or greater than the predetermined threshold (NO in step S105), the processor 81 advances the processing to step S107 described later.

On the other hand, if a tilt input having a magnitude equal to or greater than the predetermined threshold has been performed (YES in step S105), in step S106, the processor 81 sets the PC movement parameter 322 of the 2P character 211 on the basis of the content of the input indicated by the left stick data 363 (this is a process based on the third operation method). As in the case of the 1P character 201, as a result, the movement directions of the 2P character 211 and the 2P sight 212 coincide with each other, and it can be said that there is also a correlation between the movement speeds of the 2P character 211 and the 2P sight 212. Therefore, it can be said that the 2P character 211 and the 2P sight 212 have a relationship of moving in conjunction with each other.

Next, in step S107, the processor 81 sets "moving" in the PC state data 323 of the 2P character 211. Then, the processor 81 ends the 2P left stick process.

On the other hand, as a result of the determination in step S103 above, if the joining flag 310 is ON (YES in step S103), it means that the current operation mode is the joint operation mode. In this case, a process for moving the joint type player object is performed on the basis of the left stick operation by the second player. First, in step S108, the processor 81 sets the PC movement parameter 322 of the 2P character 211 on the basis of the content of the input to the left stick 32. Subsequently, in step S109, the processor 81 sets the PC movement parameter 322 of the 1P character 201 such that the 1P character 201 moves while maintaining the relative positional relationship with the 2P character 211 (i.e., with the 2P character 211 mounted on the back thereof). That is, the same movement direction and movement speed as those of the 2P character 211 are set in the PC movement parameter 322.

Next, in step S110, the processor 81 sets the sight movement parameter 342 of the 2P sight 212 on the basis of the content of the input indicated by the left stick data 363. That is, in the state as the joint type player object as well, the movement of the 2P sight 212 itself is controlled on the basis of a left stick operation by the second player. However, as described above, in the state as the joint type player object, the 2P sight 212 is in an invisible state, and thus is not displayed on the screen. Then, the processor 81 ends the 2P left stick process.

Referring back to FIG. 32, next, in step S92, the processor 81 determines whether or not the joining flag 310 is ON. As a result of the determination, if the joining flag 310 is not ON (NO in step S92), it means that the operation mode is the individual operation mode, and thus in step S93, the processor 81 executes an A-button process. That is, a process corresponding to a throw action operation by the second player is performed (a process based on the above second operation method). This process is the same process as in step S22 above, and thus the detailed description thereof is omitted. On the other hand, if the joining flag 310 is ON (YES in step S92), the process in step S93 above is skipped. That is, while the current state is the state as the joint type player object (when the operation mode is the joint operation mode), the second player cannot cause the 2P character 211 to perform the throw action.

Next, in step S94, the processor 81 executes a process based on another operation. That is, a process based on an operation by the second player other than the above first to fourth operation methods is executed. For example, if an operation for instructing a unique action such as the above "jumping" is performed, a process for causing the 2P character 211 to perform the unique action is executed as appropriate. Then, the processor 81 ends the 2P-side operation process.

[Sight Movement Control Process]

Figure 34:
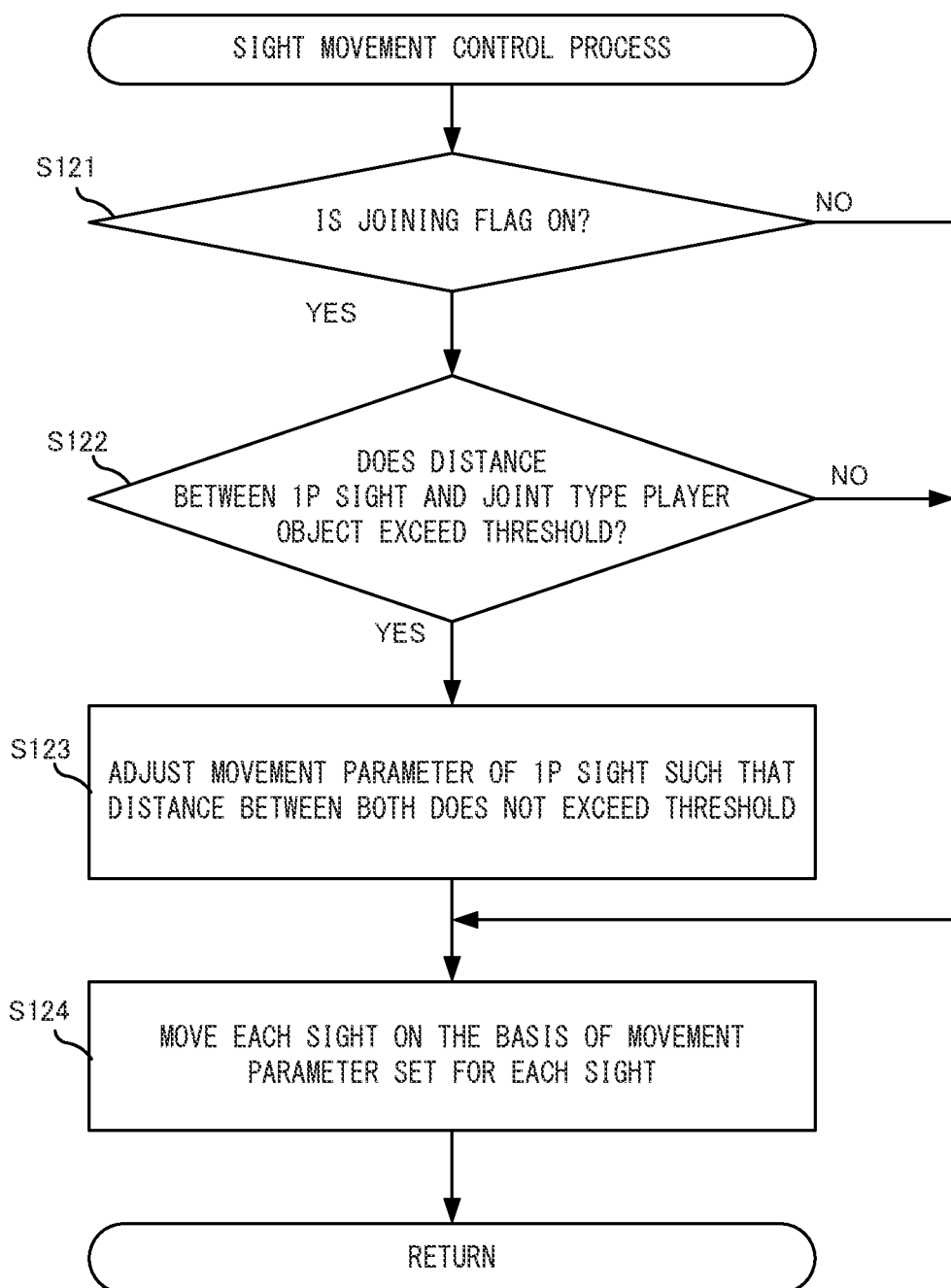
FIG. 34 is a non-limiting example flowchart showing the details of a sight movement control process.

Referring back to FIG. 25, next, in step S3, the processor 81 executes a sight movement control process. FIG. 34 is a flowchart showing the details of the sight movement control process. In FIG. 34, first, in step S121, the processor 81 determines whether or not the joining flag 310 is ON. If the joining flag 310 is OFF (NO in step S121), the processor 81 advances the processing to step S124 describe later. On the other hand, if the joining flag 310 is ON (YES in step S121), a process for performing adjustment such that the distance between the 1P sight 202 and the joint type player object does not become excessively large in the state as the joint type player object is performed. When the joint type player object (2P character 211) is directly moved by the fourth operation method, the joint type player object (2P character 211) does not move in conjunction with the 1P sight 202 in some cases. For example, when the movement direction of the 1P sight 202 and the movement direction of the joint type player object are exactly opposite to each other, the distance therebetween may become excessively large. Assuming such a case, a process of performing adjustment such that the distance between the 1P sight 202 and the joint type player object does not exceed a certain distance is performed. First, in step S122, the processor 81 determines whether or not the distance between the 1P sight 202 and the joint type player object exceeds a predetermined threshold. As a result of the determination, if this distance exceeds the predetermined threshold (YES in step S122), in step S123, the processor 81 adjusts the sight movement parameter 342 of the 1P sight 202 such that the 1P sight 202 moves to a position at which the distance between the 1P sight 202 and the joint type player object does not exceed the predetermined threshold. Then, the processor 81 advances the processing to step S124 described later.

On the other hand, as a result of the determination in step S122 above, if the distance between the 1P sight 202 and the joint type player object does not exceed the predetermined threshold (NO in step S122), the process in step S123 above is skipped.

Next, in step S124, the processor 81 moves each sight on the basis of the sight movement parameter 342 set for each of the 1P sight 202 and the 2P sight 212 (however, the 2P sight 212 is not displayed in a state as the joint type player object). Then, the processor 81 ends the sight movement control process.

[Movement Control Process of Each PC]

Figure 35:
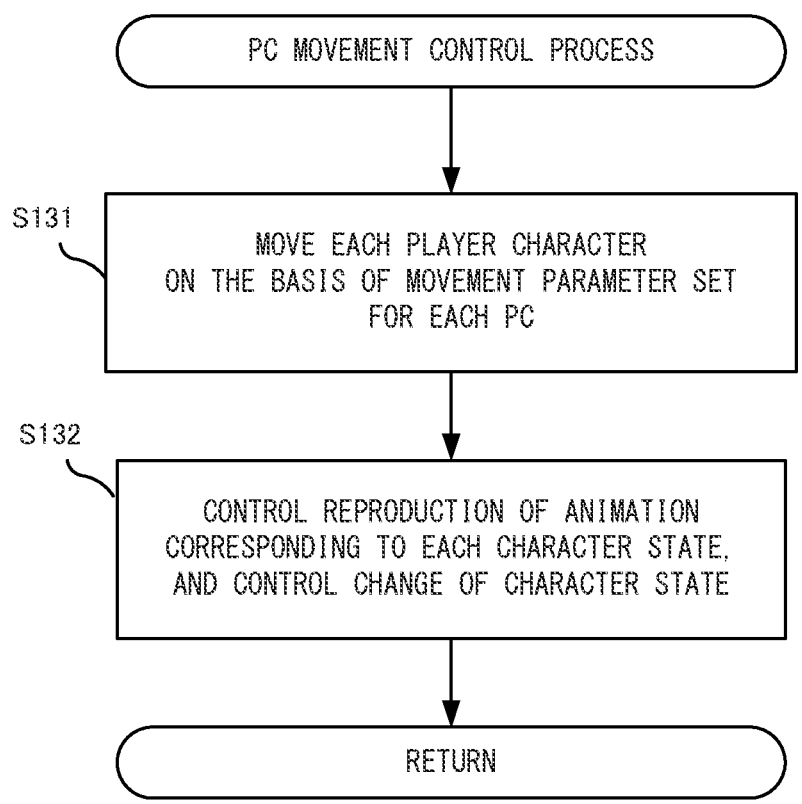
FIG. 35 is a non-limiting example flowchart showing the details of a PC movement control process.

Referring back to FIG. 25, next, in step S4, the processor 81 executes a PC movement control process. FIG. 35 is a flowchart showing the details of the PC movement control process. In FIG. 35, first, in step S131, the processor 81 moves each PC on the basis of the PC movement parameter 322 set for each PC.

Next, in step S132, the processor 81 controls reproduction of the animation corresponding to the PC state of each PC. For example, if the PC state is "moving", a running action animation is reproduced. In addition, for example, if the PC state is "middle of joining", an action animation in which the 1P character 201 leaps onto the 2P character 211 is reproduced. As for the 2P character 211, for example, an animation in which the 2P character 211 waits at that place is reproduced. In addition, if the PC state is "middle of cancellation", as for the 1P character 201, an action animation in which the 1P character 201 leaps down from the 2P character 211 and lands on the ground is reproduced. As for the 2P character 211, in this case as well, an animation in which the 2P character 211 waits at that place is reproduced. Furthermore, for example, when the movement of the 1P character 201 is completed, the processor 81 also performs control of shifting the PC state to another state as appropriate along with the end of the predetermined action by the PC, such as changing the PC state of the 1P character 201 from "moving" to "waiting". Then, the processor 81 ends the PC movement control process.

Through the above-described movement control, in the individual operation mode, control in which each sight and each PC move in conjunction with each other is performed. Meanwhile, in the joint operation mode, control in which the sight and the joint type player object do not move in conjunction with each other is performed. Here, supplementary description will be given regarding the movement in conjunction. For example, in the joint operation mode, the case where the first player is not performing a sighting operation and only the second player is performing a movement operation for the joint type player object is assumed. In this case, as a result of the above process, the 1P sight 202 also moves while the relative positional relationship between the 1P sight 202 and the joint type player object is maintained, but this movement does not correspond to the above-described movement in conjunction. This is because even if the movement direction of the joint type player object is changed, the direction of the 1P sight 202 based on the joint type player object is not changed.

[Association Object Movement Control]

Referring back to FIG. 25, next, in step S5, the processor 81 executes an association object movement control process. The processor 81 performs a process of moving each association object on the basis of the association movement parameter 385 set for each association object. Moreover, the processor 81 also reproduces an animation corresponding to the association character state 384 of each association object. In addition to the above, the processor 81 also performs control of causing the association object to perform a predetermined action (such as attacking action) if necessary.

[Other Game Processing]

Next, in step S6, the processor 81 executes various types of game processing other than the above. For example, a process of controlling the action of a predetermined enemy character, etc., are performed.

[Output of Game Image]

Next, in step S7, the processor 81 executes a game image output control process. That is, the processor 81 takes an image of the virtual game space in which the above game processing is reflected, with the virtual camera to generate a game image. Then, the processor 81 outputs the game image to the stationary monitor or the like.

Next, in step S8, the processor 81 determines whether or not an end condition for the game processing has been satisfied. For example, the processor 81 determines whether or not a game end instruction operation has been performed by the player. As a result, if the end condition has not been satisfied (NO in step S8), the processor 81 returns to step S1 above and repeats the processing. If the end condition has been satisfied (YES in step S8), the processor 81 ends the multiplayer mode processing.

[Details of Processing in Single Play Mode]

Figure 36:
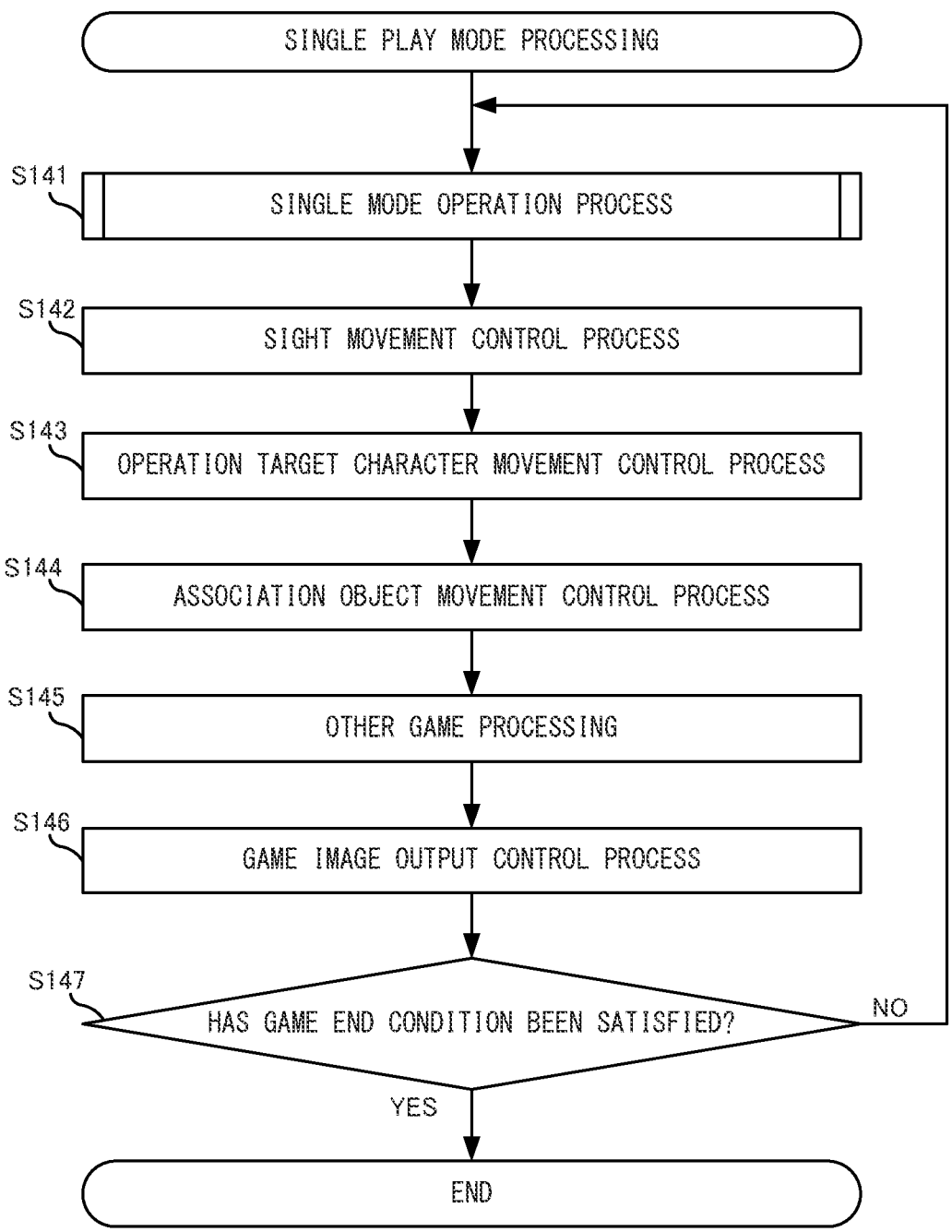
FIG. 36 is a non-limiting example flowchart showing the details of single play mode processing.

Next, the details of processing in the single play mode will be described. FIG. 36 is a flowchart showing the details of single play mode processing according to the exemplary embodiment. The processing related to this flowchart is started, for example, in accordance with an operation for starting single play being performed from a predetermined menu. A part of the processing in the single play mode includes the same processes as in the above multiplayer mode processing. Therefore, the detailed description of such processes is omitted.

Figure 37:
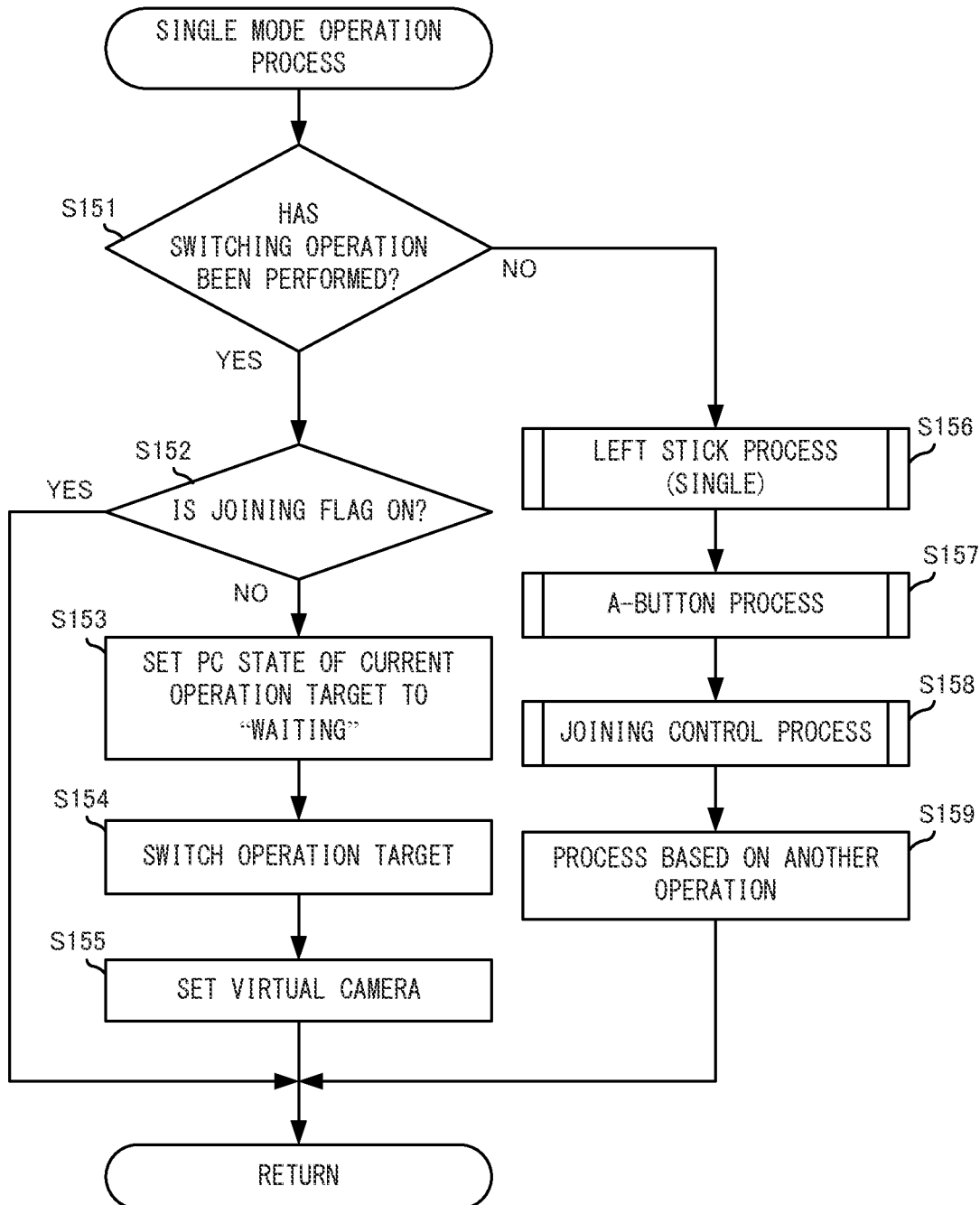
FIG. 37 is a non-limiting example flowchart showing the details of a single mode operation process.

In FIG. 36, first, in step S141, the processor 81 executes a single mode operation process. FIG. 37 is a flowchart showing the details of the single mode operation process. First, in step S151, the processor 81 determines whether or not an operation target switching operation has been performed, on the basis of the 1P operation data 306. As a result of the determination, if the operation target switching operation has been performed (YES in step S151), in step S152, the processor 81 determines whether or not the joining flag 310 is ON. That is, the processor 81 determines whether or not the current state is a state as the joint type player object.

As a result of the determination, if the joining flag 310 is ON (YES in step S152), the processor 81 ends the single mode operation process. That is, while the operation target is the joint type player object, the switching operation is actually not accepted.

On the other hand, if the joining flag 310 is not ON (NO in step S152), in step S153, the processor 81 refers to the operation target information 311 and specifies the current operation target PC. Then, the processor 81 sets "waiting" in the PC state data 323 of this PC.

Next, in step S154, the processor 81 performs a process of switching the operation target between the 1P character 201 and the 2P character 211. That is, the processor 81 switches the operation target by changing the content of the operation target information 311 to the PC that is not the current operation target. In addition, along with this, the processor 81 also performs a process of switching display/non-display of the sight. That is, the processor 81 sets the visibility flag 343 for the PC that is the operation target before switching, to be OFF, and sets the visibility flag 343 for the PC that is the operation target after switching, to be ON.

Next, in step S155, the processor 81 sets the virtual camera in accordance with the switching of the operation target. That is, the processor 81 moves the position of the virtual camera such that the PC that is the operation target after the switching is located substantially at the center of the screen. Or, in the case where a virtual camera corresponding to each PC is used, for example, the virtual camera for the PC that is the operation target after the switching is enabled, and the virtual camera for the PC before the switching is disabled. In either case, the virtual camera may be set such that a game image in which the PC after the switching of the operation target is focused on is displayed. Then, the processor 81 ends the single mode operation process.

Next, a process in the case where, as a result of the determination in step S151 above, the switching operation has not been performed will be described. In this case, a process for operating the current operation target PC is executed on the basis of an input to the controller. First, in step S156, the processor 81 executes a left stick process (single). FIG. 38 is a flowchart showing the details of the left stick process (single). As this process, a process that is substantially the same as a process obtained by removing the process in step S34 above from the 1P left stick process (see FIG. 27) in the multiplayer mode, is executed. In addition, in the process, instead of the 1P character 201 to be controlled in the 1P left stick process, the PC that is the operation target at that time is controlled. Therefore, the detailed description of this process is omitted, and in steps S161 to S163 in FIG. 38, sight movement control by the above first operation method is performed as in steps S31 to S33 in FIG. 27 above. In addition, in processes in steps S164 to S166, control of moving the operation target PC by the third operation method is performed as in steps S35 to S37 above. If the operation target is the joint type player object, control in which the 1P sight 202 and the 2P character 211 (on which the 1P character is mounted) (i.e., the joint type player object) move in conjunction with each other, is performed. In other words, in the single play mode, it can be said that the operation to be performed by the player is the same when the operation target is the joint type player object and when the operation target is not the joint type player object. This is because in both cases, control in which the operation target PC and the sight are moved in conjunction with each other by an operation on the left stick 32, is performed.

Referring back to FIG. 37, next, in step S157, the processor 81 executes an A-button process. As this process, a process that is the same as the above A-button process (see FIG. 28) in the multiplayer mode except that the current operation target PC (in a state as the joint type player object, the joint type player object) is controlled, is performed. Therefore, here, the detailed description of this process is omitted, but in this process, control of causing the operation target PC to perform the throw action in accordance with an input to the A-button 53 is performed.

Figure 40:
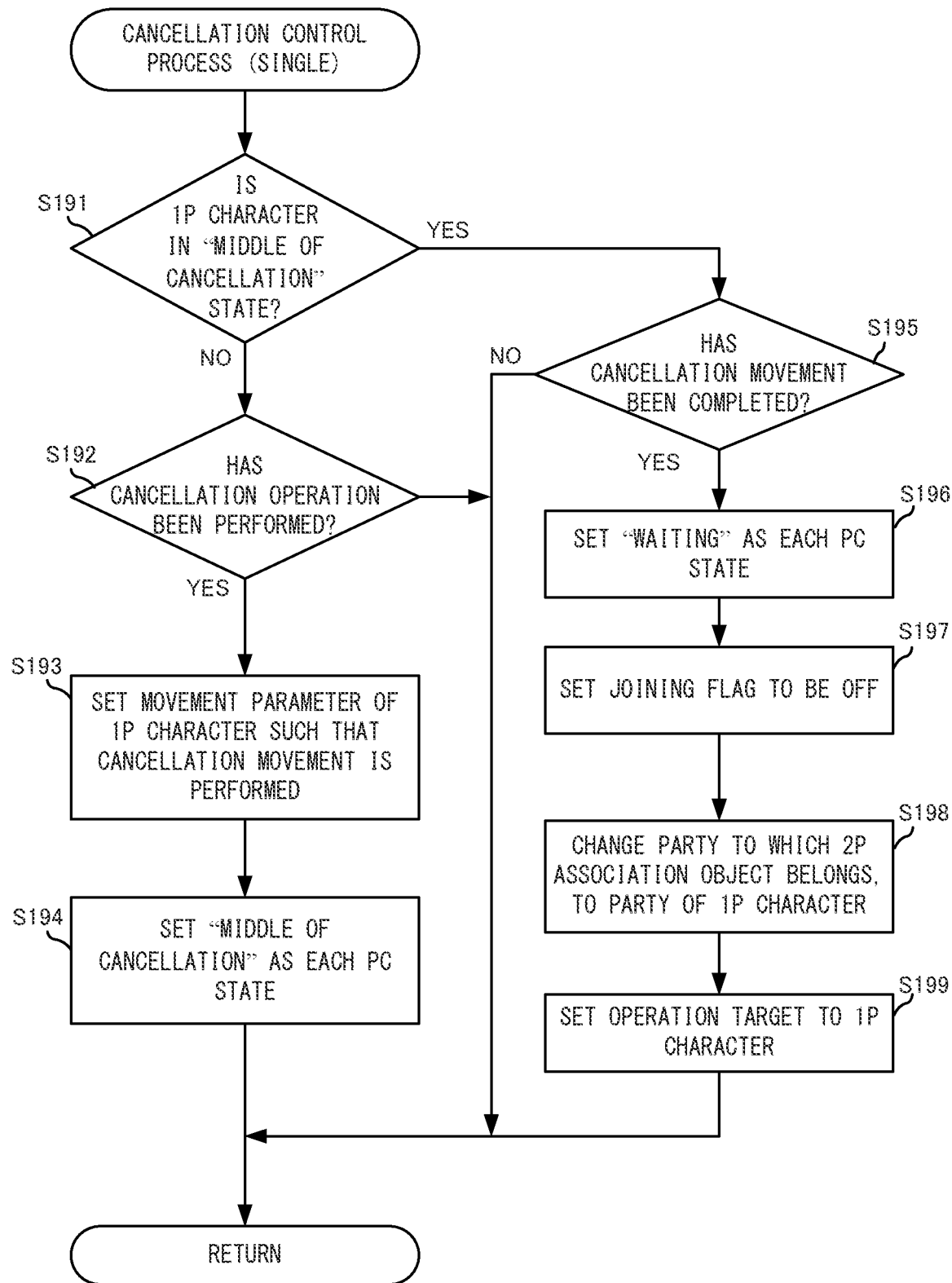
FIG. 40 is a non-limiting example flowchart showing the details of a cancellation control process (single).

Next, in step S158, the processor 81 executes a joining-related process. As this process, basically, a process that is the same as the joining-related process in step S23 in the multiplayer mode is performed. However, instead of the joining control process shown in FIG. 30 above, a joining control process (single) shown in FIG. 39 is executed. In addition, instead of the cancellation control process shown in FIG. 31, a cancellation control process (single) shown in FIG. 40 is executed. Hereinafter, each process will be described.

First, the joining control process (single) shown in FIG. 39 will be described. Basically, a process that is substantially the same as the joining control process shown in FIG. 30 above is performed. Specifically, as processes in step S171 to S180 in FIG. 39, the same processes as those in steps S61 to S70 in FIG. 30 above are performed. However, as for determination as to the "joining operation" in step S172, when the operation target is the 2P character 211, if the Y button 56 is pressed in a state where the 2P character 211 is close to the 1P character 201 to some extent, it is determined that the joining operation has been performed. In another exemplary embodiment, control in which the joining operation is not accepted may be performed when the 2P character 211 is the operation target. That is, as in the case of the multiplayer mode, in the single play mode as well, the joining operation may be able to be performed only from the 1P character 201 side. In addition, in the process in step S180, if the 1P sight 202 is in an invisible state, a process of setting the visibility flag 343 of the 1P character 201 to be ON is also performed as appropriate.

In the case of the single play mode, a process in step S181 in FIG. 39 is further performed. In step S181, the processor 81 sets "joint type player object" in the operation target information 311. That is, when the joining movement is completed, a process of setting the operation target to be "joint type player object" is performed.

Next, the cancellation control process (single) shown in FIG. 40 will be described. Basically, a process that is substantially the same as the cancellation control process described above with reference to FIG. 31 is performed. Specifically, as processes in steps S191 to S197 in FIG. 40, the same processes as those in steps S81 to S87 in FIG. 31 above are performed. On the other hand, the process in step S88 in FIG. 31, that is, visualization of the 2P sight 212, is not performed in this process. In addition, processes in step S198 and S199 are different from those in the cancellation control process in the multiplayer mode. Specifically, in step S198, the processor 81 changes the party to which the 2P association objects belong to, to the party of the 1P character 201. As described above, in the case of the single play mode, when the state as the joint type player object is cancelled, the association objects join and follow the party of the 1P character 201.

Next, in step S199, the processor 81 sets the 1P character 201 in the operation target information 311. That is, immediately after the state as the joint type player object is cancelled, the 1P character 201 automatically becomes the operation target (therefore, visualization of the 2P sight 212 is not performed). Then, the processor 81 ends the cancellation control process (single).

Referring back to FIG. 37, next, in step S159, the processor 81 executes a process based on another operation. In this process, various types of game processing based on operations other than operations on the left stick 32, the A-button 53, and the Y button 56 are executed. Then, the processor 81 ends the single mode operation process.

Referring back to FIG. 36, next, in step S142, the processor 81 executes a sight movement control process. As this process, a process of moving the sight for the operation target at that time on the basis of the sight movement parameter 342 is performed.

Next, in step S143, the processor 81 executes an operation target character movement control process. In this process, a process of moving the PC (any one of the 1P character 201, the 2P character 211, and the joint type player object) that is the operation target at that time on the basis of the PC movement parameter 322 is performed.

Next, in step S144, the processor 81 executes an association object movement control process. That is, a process of controlling the movement of each association object is performed as in the process in step S5 above.

Next, in step S145, the processor 81 executes various types of game processing other than the above. Subsequently, in step S146, the processor 81 executes a game image output control process. That is, the processor 81 generates and outputs a game image in which the above game processing is reflected.

Next, in step S147, the processor 81 determines whether or not an end condition for the game processing has been satisfied. If the end condition has not been satisfied (NO in step S147), the processor 81 returns to step S141 above and repeats the processing. If the end condition has been satisfied (YES in step S147), the processor 81 ends the single play mode processing.

This is the end of the detailed description of the game processing related to the multiplayer mode and the single play mode according to the exemplary embodiment.

As described above, in the exemplary embodiment, in the multiplayer mode, two types of operation methods of the individual operation mode and the joint operation mode are provided for the movement of the sights and the PCs. In the individual operation mode, each player has to operate the controller with awareness of two operations, that is, the operation for the sight and the movement operation for the PC, but in the joint operation mode, each player only has to perform only either one of the two operations. Therefore, the ease of operation can be improved by using the operation in the joint operation mode. In addition, in both cases, operation using the left stick 32 is provided, and common operability is provided in both the individual operation mode and the joint operation mode. Therefore, even if the operation mode is switched between the individual operation mode and the joint operation mode, each player can be allowed to continue the game play without being confused about the operation before and after the switching Modifications In the above embodiment, as for the operation of the 2P sight 212, the example in which even when the PC is in a state as the joint type player object, the 2P sight 212 in an invisible state itself is moved on the basis of a left stick input, has been described. In another exemplary embodiment, when the PC is in a state as the joint type player object, an input to the left stick 32 may not necessarily be reflected in the movement of the 2P sight 212. That is, when the PC is in a state as the joint type player object, the movement control process for the 2P sight 212 may not necessarily be performed. Accordingly, the processing load can be reduced when the PC is in a state as the joint type player object.

In another exemplary embodiment, in the case of the single play mode, the 2P character 211 may be able to be any of a "leader" and a "member". When the above joining is cancelled, the 2P character 211 may be added as a "member" of the party of the 1P character 201. Accordingly, after the joining is cancelled, the 2P character 211 can also be moved so as to follow the movement of the 1P character 201. That is, the 1P character 201 and the 2P character 211 can be moved together, so that the convenience and playing comfort of the player in the single play mode can be improved.

In the above embodiment, the case where the association objects are biological objects as an example has been described. In addition, non-biological objects such as weapons may be treated as the association objects.

In the above embodiment, the example in which the 1P association objects 203 are merged into the 2P association objects 213 when the PC becomes the joint type player object, has been described. In another exemplary embodiment, control in which, instead of merging, the 1P association object 203 and the 2P association object 213 are "combined" or "synthesized" into a new association object (combined association object) having a different appearance may be performed. For example, the 1P association object 203 may be combined with the 2P association object 213 to form a combined association object having a larger size than a normal association object and having a different appearance. In addition, if the association objects are non-biological objects such as weapons, a first weapon object which is the 1P association object 203 and a second weapon object which is the 2P association object 213 may be synthesized and made usable as a third weapon object. Moreover, when a state as the joint type player object is cancelled, the combination or synthesis of the association objects may be cancelled. In this case, as for the belonging relationship of each association object to the party, the belonging relationship before the combination may be restored, or the association object may be caused to belong to only either one of the party of the 1P character 201 (in the case of the single play mode) or the party of the 2P character 211 (in the case of the multiplayer mode). The performance of the association object that is "combined" or the like as described above may be improved to be better than that when the association object is not "combined" or the like. For example, the association object may be caused to have an attack method or means that is not possible in a state as the normal association object. By improving the performance of the association object through "combination" or "synthesis" as described above, it is possible to provide motivation to actively utilize the joint type player object to the player, and it is also possible to improve the entertainment characteristics of the game.

In the above embodiment, the example in which when the joining is cancelled in the single play mode, the 1P character 201 becomes the operation target and the 2P association objects 213 all become the 1P association objects 203, has been described. In another exemplary embodiment, when the joining is cancelled in the single play mode, the 2P character 211 may be set as the operation target, and the belonging relationship of each 2P association object 213 may not necessarily be changed.

In the above embodiment, the example in which the joining operation and the cancellation operation for joining are performed by operating the Y button 56 has been described. In another exemplary embodiment, joining may be enabled without performing such an operation. For example, a state as the joint type player object may be automatically caused when a predetermined gauge is fully accumulated. In addition, cancellation of joining may be enabled without performing the above operation. For example, joining may be automatically cancelled when a predetermined time elapses.

As for the operation for joining, in the above embodiment, the example in which the Y button 56 is pressed in a state where the 1P character 201 and the 2P character 211 are close to each other to some extent, has been described. In another exemplary embodiment, joining may be always enabled regardless of the distance between the 1P character 201 and the 2P character 211.

In the above embodiment, when the sight is moved by an input in which the tilt of the left stick 32 is small, control in which the sight is not separated from the PC by a certain distance or more is performed. In this regard, in another exemplary embodiment, the movement of the sight may be prioritized, and control in which the PC is moved toward the sight such that the distance therebetween does not exceed the certain distance may be performed. For example, the case where the relative distance between the sight and the PC reaches 5 m or more as a result of operating the left stick 32 at a small tilt and moving only the sight, is assumed. In such a case, control in which the position of the PC is automatically moved closer to the sight may be performed, and adjustment may be performed such that the distance therebetween does not reach 5 m.

In the above embodiment, the example in which the sight and the PC move while maintaining the relative distance (positional relationship) therebetween, has been described. Therefore, for example, in the joint operation mode, even when the first player does not perform any operation and only the second player performs a movement operation for the joint type player object, the 1P sight 202 moves while maintaining the relative positional relationship with the joint type player object in some cases. In this regard, in another exemplary embodiment, in the joint operation mode, the 1P sight 202 and the joint type player object may each be movable without maintaining the relative distance therebetween. For example, when the first player does not perform any operation and only the second player performs a movement operation for the joint type player object, only the joint type player object may move without changing the position of the 1P sight 202 in the virtual space.

When the second player moves the joint type player object, the magnitude of the tilt angle of the left stick 32, which is taken into consideration in the individual operation mode, may not necessarily be taken into consideration. That is, if an input to the left stick 32 is detected, control in which the joint type player object is moved in accordance with the input may be performed regardless of the magnitude of the tilt angle. Accordingly, it is possible to move the joint type player object in a finer manner than in the individual operation mode. That is, it is possible to perform fine adjustment of the position of the joint type player object by a delicate operation in which the tilt of the left stick 32 is small. In this case, for the second player, the operation feeling in the joint operation mode can be slightly different from that in the individual operation mode in that such fine adjustment can be performed.

In the above embodiment, the case where the series of processes related to the game processing is performed in the single main body apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the main body apparatus 2 may be configured to send operation data indicating a player's operation to a predetermined server, and the server may be configured to execute various kinds of game processing and stream the execution results as video/audio to the main body apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A computer-readable non-transitory storage medium having stored therein instructions that, when executed by a computer of an information processing apparatus, cause the computer of the information processing apparatus to:

in a multiplayer mode in which a video game is played by a plurality of players, switch an operation method in which player objects are operated by inputs by the plurality of players, from an individual operation method to a joint operation method when a switching condition is satisfied;

in the individual operation method, move a sight associated with the player object corresponding to each of the plurality of players, by a first operation method using a sight movement instruction input performed by each of the plurality of players, cause the player object corresponding to each of the plurality of players to execute an action toward the sight associated with the player object by a second operation method using an action instruction input performed by each of the plurality of players, and move the player object corresponding to each of the plurality of players by a third operation method; and in the joint operation method, move the sight associated with a joint player object by the first operation method using the sight movement instruction input performed by a first player out of the plurality of players, cause the joint player object to execute the action toward the sight associated with the joint player object by the second operation method using the action instruction input performed by the first player, and move the joint player object by a fourth operation method based on a movement input by a second player out of the plurality of players.

2. The storage medium according to claim 1, wherein the fourth operation method is an operation method different from the third operation method.

3. The storage medium according to claim 1, wherein, as the fourth operation method, the joint player object is moved in a manner in which the joint player object is movable in a direction different from that of movement of the sight associated with the joint player object, on the basis of the movement input by the second player.

4. The storage medium according to claim 3, wherein, as the fourth operation method, the joint player object is moved directly on the basis of the movement input by the second player.

5. The storage medium according to claim 1, wherein the joint player object is an object obtained by combining the player objects respectively corresponding to the plurality of players.

6. The storage medium according to claim 5, wherein the joint player object is an object in which the player object corresponding to the first player in the individual operation method is placed on the player object corresponding to the second player in the individual operation method.

7. The storage medium according to claim 1, wherein the switching condition is satisfied when the first player performs a switching operation.

8. The storage medium according to claim 1, wherein the operation method is switched from the joint operation method to the individual operation method when the first player performs a cancellation operation when the operation method is the joint operation method.

9. The storage medium according to claim 1, wherein the instructions further cause the computer to, when the operation method is switched from the individual operation method to the joint operation method, associate association objects obtained by merging association objects associated with the player objects respectively corresponding to the plurality of players in the individual operation method, with the joint player object.

10. The storage medium according to claim 9, wherein, when the operation method is switched from the joint operation method to the individual operation method, the association objects associated with the joint player object in the joint operation method are all associated with the player object corresponding to the second player.

11. The storage medium according to claim 1, wherein the instructions further cause the computer to, when the operation method is switched from the individual operation method to the joint operation method, associate a combined association object obtained by combining or synthesizing association objects associated with the player objects respectively corresponding to the plurality of players in the individual operation method, with the joint player object.

12. The storage medium according to claim 1, wherein, as the third operation method, the player object corresponding to each of the plurality of players is moved in conjunction with movement of the sight.

13. The storage medium according to claim 12, wherein the player object is moved so as to follow the movement of the sight.

14. The storage medium according to claim 1, wherein the player object corresponding to the second player in the individual operation method has higher movement performance than the player object corresponding to the first player in the individual operation method, and the joint player object in the joint operation method has the movement performance of the player object corresponding to the second player in the individual operation method.

15. The storage medium according to claim 1, wherein the action is an action of throwing a predetermined object toward the sight.

16. The storage medium according to claim 1, wherein the instructions further cause the computer to, in a single play mode in which the video game is played by one player, both when the player moves the sight associated with the player object corresponding to the player and when the player moves the sight associated with the joint player object, move the sight by the first operation method using the sight movement instruction input by the player, both when the player causes the player object to execute the action and when the player causes the joint player object to execute the action, cause the player object or the joint player object to execute the action by the second operation method using the action instruction input by the player, and both when the player moves the sight associated with the player object corresponding to the player and when the player moves the sight associated with the joint player object, move the player object by the third operation method.

17. The storage medium according to claim 16, wherein the instructions further cause the computer to, when a shift from a state where the player operates the sight of the joint player object to a state where the player operates the sight associated with the player object corresponding to the player in the single play mode is made, associate the association object associated with the joint player object, with the player object.

18. The storage medium according to claim 16, wherein the instructions further cause the computer to, when a character switching condition is satisfied in the single play mode, allow the player to switch between whether to operate the sight associated with the player object corresponding to the first player in the individual operation method or operate the sight associated with the player object corresponding to the second player in the individual operation method in the multiplayer mode.

19. A processing system comprising a processor and a memory coupled thereto, the processor being configured to control the processing system to at least:

in a multiplayer mode in which a video game is played by a plurality of players, switch an operation method in which player objects are operated by inputs by the plurality of players, from an individual operation method to a joint operation method when a switching condition is satisfied;

in the individual operation method, move a sight associated with the player object corresponding to each of the plurality of players, by a first operation method using a sight movement instruction input performed by each of the plurality of players, cause the player object corresponding to each of the plurality of players to execute an action toward the sight associated with the player object by a second operation method using an action instruction input performed by each of the plurality of players, and move the player object corresponding to each of the plurality of players by a third operation method; and in the joint operation method, move the sight associated with a joint player object by the first operation method using the sight movement instruction input performed by a first player out of the plurality of players, cause the joint player object to execute the action toward the sight associated with the joint player object by the second operation method using the action instruction input performed by the first player, and move the joint player object by a fourth operation method based on a movement input by a second player out of the plurality of players.

20. An information processing method executed by a computer configured to control an information processing apparatus, the information processing method causing the computer to:

in a multiplayer mode in which a video game is played by a plurality of players, switch an operation method in which player objects are operated by inputs by the plurality of players, from an individual operation method to a joint operation method when a switching condition is satisfied;

in the individual operation method, move a sight associated with the player object corresponding to each of the plurality of players, by a first operation method using a sight movement instruction input performed by each of the plurality of players, cause the player object corresponding to each of the plurality of players to execute an action toward the sight associated with the player object by a second operation method using an action instruction input performed by each of the plurality of players, and move the player object corresponding to each of the plurality of players by a third operation method; and in the joint operation method, move the sight associated with a joint player object by the first operation method using the sight movement instruction input performed by a first player out of the plurality of players, cause the joint player object to execute the action toward the sight associated with the joint player object by the second operation method using the action instruction input performed by the first player, and move the joint player object by a fourth operation method based on a movement input by a second player out of the plurality of players.

* * * * *